US007710388B2

United States Patent
Hirata et al.

(10) Patent No.: US 7,710,388 B2
(45) Date of Patent: May 4, 2010

(54) DISPLAY DEVICE HAVING PIXELS INCLUDING A PLURALITY OF SUB-PIXELS

(75) Inventors: Mitsuaki Hirata, Mie (JP); Masanori Takeuchi, Mie (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 834 days.

(21) Appl. No.: 11/020,092

(22) Filed: Dec. 27, 2004

(65) Prior Publication Data

US 2005/0168423 A1 Aug. 4, 2005

(30) Foreign Application Priority Data

Dec. 26, 2003 (JP) ............................ 2003-435257
Nov. 16, 2004 (JP) ............................ 2004-332195

(51) Int. Cl.
*G09G 3/36* (2006.01)
*G09G 5/02* (2006.01)
*G02F 1/1343* (2006.01)

(52) U.S. Cl. ........................ 345/103; 345/694; 349/139

(58) Field of Classification Search ................. 345/694, 345/695, 696, 88, 83, 96, 103, 89, 90; 349/139
See application file for complete search history.

(56) References Cited

U.S. PATENT DOCUMENTS 6,407,793 B1 * 6/2002 Liang et al. ................. 349/139
6,628,356 B2 * 9/2003 Shimada et al. ............. 349/106
7,187,353 B2 * 3/2007 Credelle et al. ............... 345/88
7,206,005 B2 * 4/2007 Yamashita et al. .......... 345/695
7,268,757 B2 * 9/2007 Ben-David et al. ............ 345/88
2001/0008435 A1 7/2001 Shimada et al.
2002/0063670 A1 * 5/2002 Yoshinaga et al. ............ 345/87

FOREIGN PATENT DOCUMENTS

JP 6-102503 A 4/1994
JP 2001-272689 A 10/2001

OTHER PUBLICATIONS

Candice Hellen Brown Elliott; "Reducing Pixel Count Without Reducing Image Quality"; Information Display, U.S.A.; The Society for Information Display; Dec. 1999; vol. 15, No. 12; pp. 22-25.

* cited by examiner

*Primary Examiner*—Bipin Shalwala
*Assistant Examiner*—Steven E Holton
(74) *Attorney, Agent, or Firm*—Birch, Stewart, Kolasch & Birch, LLP

(57) ABSTRACT

A display device includes a plurality of pixels arranged in a matrix. At least one of the pixels includes two sub-pixel groups. Each of the sub-pixel groups includes sub-pixels of three or more colors. Sub-pixels of the same color in each pixel are driven by the same signal.

16 Claims, 13 Drawing Sheets

Prior Art

DISPLAY DEVICE HAVING PIXELS INCLUDING A PLURALITY OF SUB-PIXELS

CROSS-REFERENCE TO RELATED APPLICATIONS

This Nonprovisional application claims priority under 35 U.S.C. §119 (a) on Patent Applications No. 2003-435257 filed in Japan on Dec. 26, 2003 and No. 2004-332195 filed in Japan on Nov. 16, 2004, the entire contents of which are hereby incorporated by reference.

BACKGROUND OF THE INVENTION

1. Field of the Invention

The present invention relates to a display, such as a liquid crystal display (LCD) device, a plasma display panel (PDP), an inorganic or organic electroluminescence (EL) display device, a light emitting diode (LED) display device, a fluorescence display tube, a field emission display device, an electrophoretic display device, an electrochromic display device, a cathode ray tube (CRT) display device, or the like.

2. Description of the Prior Art

The flat panel display (hereafter, referred to as “FPD”), such as a liquid crystal display, a plasma display, an EL display, or the like, has pixels arranged in a matrix on a substrate made of glass, plastic, semiconductor, or the like, and optically controls the pixels according to an external electric signal to display images. In general, each pixel includes sub-pixels of three primary colors (red, green, and blue). Each sub-pixel is the minimum unit of display. These sub-pixels are separately controlled by different signals.

In the FPD, the size of a pixel is determined by the size and resolution of the display. For example, in a 37-inch diagonal WXGA (Wide eXtended Graphics Array) FPD having the resolution of 1366×768, the size of one pixel is 600 μm×600 μm. The shape of a pixel is not necessarily a square depending on the specifications of a display but is a square in general. In the case where the size of one pixel is 600 μm×600 μm and one pixel is formed by stripe-shaped sub-pixels of R(red), G(green) and B (blue), the size of one sub-pixel is 200 μm (a ⅓ of the pixel width)×600 μm.

FIG. 13 is a general plan view of a commonly-employed pixel. The pixel 101 includes a red sub-pixel 102, a green sub-pixel 103, and a blue sub-pixel 104. The red sub-pixel 102, the green sub-pixel 103, and the blue sub-pixel 104 are electrically connected to a signal line 105 for the red sub-pixel, a signal line 106 for the green sub-pixel, a signal line 107 for the blue sub-pixel, respectively. In many liquid crystal display devices and organic EL displays, a signal line is connected to a sub-pixel through a thin film transistor (TFT), a diode, or the like. It should be noted that, in a duty-driven display device, such as a plasma display, or the like, a signal line itself functions as a sub-pixel. The red sub-pixel 102, the green sub-pixel 103, and the blue sub-pixel 104 are driven by signals supplied through the corresponding signal lines to carry out matrix display.

In general, a human eye has high sensitivity to green, and the ratio of lightness of the primary colors (red, green, blue) is approximately 5:12:2. In the stripe arrangement, sub-pixels of the same color are aligned in the vertical direction. Thus, when the color of white is displayed over the entire screen, vertical lines of yellow, which is the combination of red and green, and vertical lines of blue periodically occur. These lines are visually perceived as a vertical stripe pattern. Even with other display examples, such as a human face, plain (patternless) wallpaper, or the like, vertical stripes (vertical lines) occur over the entire screen, resulting in deteriorated display quality.

This phenomenon is now described in detail with reference to FIG. 1. FIG. 1 is a so-called Campbell-Robson CSF Chart. In this chart, the horizontal axis denotes the resolution of the stripes, and the vertical axis denotes the brightness ratio of the stripes (contrast). A pattern of light and shade of the stripes is modeled as a wave where the horizontal axis is the spatial frequency. The spatial frequency is represented by the number of pairs of black/white lines and spaces which exist in a view field of 1°. The unit of the spatial frequency is “cycle/degree”. The brightness ratio of the stripes (contrast) is represented by a gray scale of 8 bits on a display. Specifically, the 128th level (contrast=1) of the gray scale corresponds to the top of the Campbell-Robson CSF Chart of FIG. 1, and the 0th and 255th levels (contrast is about 500 to 1000) correspond to the bottom of the chart.

FIG. 2 is a graph showing a resolution limit curve measured using a Campbell-Robson CSF Chart. The vertical and horizontal axis are the same as those of the Campbell-Robson CSF Chart of FIG. 1. The inside of the curve of FIG. 2 is a region where the vertical stripes are seen. As seen from FIG. 2, the visibility of the stripe pattern of sub-pixels depends on the distance between a viewer and a display device, the size of sub-pixels and the contrast.

The contrast is the ratio of the intensity of blue to the sum of the intensities of green and red and therefore can be theoretically calculated. For example, in the case of a liquid crystal display device, the ratio of the transmittance of a color filter can be used as a substitute for the ratio of the color intensity. In a typical color filter, the transmittance of blue part is 8.7%, the transmittance of green part is 57%, and the transmittance of red part is 22%. Based on a calculation with these values, the transmittance ratio of the color filter is (57+22)/8.7=9.1. That is, the contrast is about 9. The transmittance is different among color filters of different types. In the case of an emission display, such as a PDP, or the like, the brightness is measured instead of the transmittance. However, the contrast is always about 9 so long as the display device is based on the RGB primary colors. Therefore, the stripe pattern is more conspicuous as the distance between a viewer and the display device is shorter and the sub-pixel size is larger, i.e., as the resolution of the display device decreases.

Even with sub-pixel arrangements other than the pixel arrangement of the three primary colors (red, green and blue), a stripe caused by a sub-pixel of a color having a higher spectral luminous factor (hereinafter, “luminosity factor”) and a sub-pixel of a color having a lower luminosity factor based on the same mechanism is visually perceived. For example, in the case of a pixel arrangement of three colors, cyan, magenta and yellow, a stripe is visually perceived between a yellow sub-pixel having the highest luminosity factor and a magenta sub-pixel having the lowest luminosity factor. In the case of a pixel arrangement of four colors, red, green, blue and white, a stripe is visually perceived between a white sub-pixel having the highest luminosity factor and a blue sub-pixel having the lowest luminosity factor. In the case of a pixel arrangement of five colors, red, green, blue, cyan and yellow, a stripe is visually perceived between a green sub-pixel having the highest luminosity factor and a blue sub-pixel having the lowest luminosity factor.

In the case where the FPD is used for a television display, an appropriate distance between a viewer and the display device is three times the diagonal size of the screen as in a conventional CRT television display. However, in the case of a television monitor for personal use which is also used as a monitor of a PC (personal computer), the viewing distance between a viewer and the display device becomes relatively short. For example, the viewing distance is equal to or shorter than the diagonal size of the screen in many cases. Further, in the television display for personal use, higher brightness is required than in conventional PC monitors. Thus, in the case where the viewing distance is set according to the purpose of the display device, the display quality is deteriorated by the stripe pattern unless the resolution is equal to or higher than a certain level.

Specifically, as seen from FIG. 2, when the contrast is 9, the resolution limit is about 13 cycle/degree. When this resolution limit is applied to a case where the distance between a viewer and the display device is 50 cm, the pixel size (pitch) is about 400 μm. If the pitch of pixels is larger than 400 μm, vertical lines are perceived. For example, in the case of a 50-cm (19.7-inch) diagonal VGA (Video Graphics Array) class display having the resolution of 640×480, the size (pitch) of one pixel is 680 μm. Thus, vertical stripes are visually perceived, and the display quality is deteriorated.

Occurrence of the stripes due to the stripe arrangement is modified to some extent by using a delta arrangement, a mosaic arrangement, or a square arrangement disclosed in Japanese Unexamined Patent Publication No. 6-102503. However, in these examples, stripes still occur as horizontal stripes or diagonal stripes. That is, the problem is not thoroughly overcome. Further, in the case of an image with clear edges, such as display of text, a vector image, or the like, the edges are displayed in unintended colors, and such edges of the unintended colors are undesirable in personal computers and computer graphic applications.

Japanese Unexamined Patent Publication No. 2001-272689 discloses a liquid crystal display device with a stripe color filter including color filter segments of n colors (n is an integer equal to or greater than 2) wherein color filter segments of the same color are aligned in the vertical direction, sets of m color filter segments of the same color (m is an integer equal to or greater than 2) are sequentially aligned in the horizontal direction, and one pixel is formed by n×m×1 sub-pixels (1 is a natural number). However, it is not preferable that the display resolution is equal to or higher than the resolution of an input signal because the cost of peripheral circuits, such as a driver circuit, a controller, etc., increases. Further, in the case where a signal having a resolution equal to or lower than the resolution of a display device is input to the display device, for example, in the case where a signal having the resolution of VGA is input to a XGA (eXtended Graphics Array) display panel, it is necessary to increase the resolution of the signal by image processing, and accordingly, an additional circuit is required.

Candice Hellen Brown Elliott, "Reducing Pixel Count without Reducing Image Quality", *Information Display*, U.S.A, The Society for Information Display, December 1999, Vol. 15, No. 12, pp. 22-25, discloses a checkerboard pixel arrangement wherein a blue pixel is placed at the center. By employing this arrangement, at least vertical stripes are not observed. However, even when the checkerboard arrangement is employed without changing the resolution, a mixed stripe pattern including vertical stripes, horizontal stripes and diagonal stripes is observed because the spatial frequency is not changed. Thus, the above problem is not thoroughly solved by the checkerboard arrangement.

SUMMARY OF THE INVENTION

An objective of the present invention is to suppress deterioration of display quality, which would be caused by vertical stripes, without increasing the cost of peripheral circuits.

According to an aspect of the present invention, a display device comprises a plurality of pixels arranged in a matrix: wherein at least one of the pixels includes a plurality of sub-pixel groups; each of the sub-pixel groups includes sub-pixels of three or more colors; and sub-pixels of the same color in each pixel are driven by the same signal.

In one embodiment of the present invention, the display device further comprises a driving circuit for outputting a signal which is used for driving the sub-pixels, wherein the signal output from the driving signal is branched into a plurality of signals for driving the sub-pixels of the same color.

In one embodiment of the present invention, at least one of the pixels includes two sub-pixel groups which are adjacent to each other in the row direction; and each of the two sub-pixel groups includes three or more sub-pixels periodically aligned in one direction.

In one embodiment of the present invention, each of the sub-pixel groups includes sub-pixels of three colors, red, green and blue.

In one embodiment of the present invention, each of the sub-pixel groups includes sub-pixels of three colors, cyan, magenta and yellow.

In one embodiment of the present invention, each of the sub-pixel groups includes sub-pixels of four colors, red, green, blue and white.

In one embodiment of the present invention, each of the sub-pixel groups includes sub-pixels of five colors, red, green, blue, yellow and cyan.

In one embodiment of the present invention, each of the two sub-pixel groups includes sub-pixels of three colors periodically aligned in one direction; the polarity pattern of the sub-pixels included in one of two pixels which are adjacent to each other in the row direction is "+•–•+•+•–•+"; the polarity pattern of the sub-pixels included in the other pixel is "–•+•–•–•+•–"; and the polarity of the sub-pixels is inverted at a predetermined frequency.

In one embodiment of the present invention, each of the two sub-pixel groups includes sub-pixels of three colors, red, green and blue, periodically aligned in one direction; the polarity pattern of the sub-pixels included in one of two pixels which are adjacent to each other in the row direction is "+•–•+•+•–+"; the polarity pattern of the sub-pixels included in the other pixel is "–•+•–•–•+•–"; and the polarity of the sub-pixels is inverted at a predetermined frequency.

In one embodiment of the present invention, each of the two sub-pixel groups includes sub-pixels of three colors, cyan, magenta and yellow, periodically aligned in one direction; the polarity pattern of the sub-pixels included in one of two pixels which are adjacent to each other in the row direction is "+•–•+•+•–•+" the polarity pattern of the sub-pixels included in the other pixel is "–•+•–•–•+•–"; and the polarity of the sub-pixels is inverted at a predetermined frequency.

In one embodiment of the present invention, each of the two sub-pixel groups includes sub-pixels of five colors periodically aligned in one direction; the polarity pattern of the sub-pixels included in one of two pixels which are adjacent to each other in the row direction is "+•–•+•–•+•+•–•+•–•+"; the polarity pattern of the sub-pixels included in the other pixel is "–•+•–+•–•–•+•–•+•–"; and the polarity of the sub-pixels is inverted at a predetermined frequency.

In one embodiment of the present invention, each of the two sub-pixel groups includes sub-pixels of five colors, red, green, blue, yellow and cyan, periodically aligned in one direction; the polarity pattern of the sub-pixels included in one of two pixels which are adjacent to each other in the row direction is "+•–•+•–•+•+•–•+•–•+"; the polarity pattern of the sub-pixels included in the other pixel is "–•+•–•+•–•–•+•–•+•–"; and the polarity of the sub-pixels is inverted at a predetermined frequency.

In one embodiment of the present invention, the display device further comprises a plurality of signal lines extending in the column direction and electrically connected to the sub-pixels, wherein: each of the sub-pixels is interposed between two of the signal lines which are adjacent to each other in the row direction; and among the sub-pixels which constitute the sub-pixel groups, a sub-pixel which is interposed between signal lines of the same polarity has the lowest luminosity factor.

In one embodiment of the present invention, the display device further comprises a plurality of signal lines extending in the column direction and electrically connected to the sub-pixels, wherein: each of the sub-pixels is interposed between two of the signal lines which are adjacent to each other in the row direction; and a sub-pixel which is interposed between signal lines of the same polarity is a blue sub-pixel.

In one embodiment of the present invention, the display device further comprises a plurality of signal lines extending in the column direction and electrically connected to the sub-pixels, wherein: each of the sub-pixels is interposed between two of the signal lines which are adjacent to each other in the row direction; and a sub-pixel which is interposed between signal lines of the same polarity is a magenta sub-pixel.

In one embodiment of the present invention, the display device further comprises a plurality of signal lines extending in the column direction and electrically connected to the sub-pixels, wherein: each of the sub-pixels is interposed between two of the signal lines which are adjacent to each other in the row direction; and a sub-pixel which is interposed between signal lines of the same polarity has an aperture ratio different from that of a sub-pixel of the same color which is interposed between signal lines of different polarities.

In one embodiment of the present invention, the display device further comprises a plurality of signal lines extending in the column direction and electrically connected to the sub-pixels, wherein: each of the sub-pixels is interposed between two of the signal lines which are adjacent to each other in the row direction; and a blue sub-pixel which is interposed between signal lines of the same polarity has an aperture ratio different from that of a blue sub-pixel which is interposed between signal lines of different polarities.

In one embodiment of the present invention, the display device further comprises a plurality of signal lines extending in the column direction and electrically connected to the sub-pixels, wherein: each of the sub-pixels is interposed between two of the signal lines which are adjacent to each other in the row direction; and a magenta sub-pixel which is interposed between signal lines of the same polarity has an aperture ratio different from that of a magenta sub-pixel which is interposed between signal lines of different polarities.

In one embodiment of the present invention, the display device further comprises a plurality of signal lines extending in the column direction and electrically connected to the sub-pixels, wherein: each of the sub-pixels is interposed between two of the signal lines which are adjacent to each other in the row direction; and the aperture ratio of a sub-pixel which is interposed between signal lines of the same polarity and has a color of the lowest luminosity factor among the sub-pixels which constitute the sub-pixel groups is lower than that of a sub-pixel of the same color which is interposed between signal lines of different polarities by about 10% to about 30%.

In one embodiment of the present invention, the display device further comprises a plurality of signal lines extending in the column direction and electrically connected to the sub-pixels, wherein: each of the sub-pixels is interposed between two of the signal lines which are adjacent to each other in the row direction; and the aperture ratio of a blue sub-pixel which is interposed between signal lines of the same polarity is lower than that of a blue sub-pixel which is interposed between signal lines of different polarities by about 10% to about 30%.

In one embodiment of the present invention, the display device further comprises a plurality of signal lines extending in the column direction and electrically connected to the sub-pixels, wherein: each of the sub-pixels is interposed between two of the signal lines which are adjacent to each other in the row direction; and the aperture ratio of a magenta sub-pixel which is interposed between signal lines of the same polarity is lower than that of a magenta sub-pixel which is interposed between signal lines of different polarities by about 10% to about 30%.

In one embodiment of the present invention, one of the sub-pixels constituting the sub-pixel group which has the lowest luminosity is sandwiched along the row direction by a sub-pixel of a color having the highest luminosity factor and a sub-pixel of a color having the second highest luminosity factor.

In one embodiment of the present invention, the pixel includes two sub-pixel groups which are adjacent to each other in the row direction, each of the sub-pixel groups including sub-pixels of three colors, red, green and blue, periodically aligned in one direction; and a blue sub-pixel included in the sub-pixel group is sandwiched along the row direction by a green sub-pixel and a red sub-pixel.

In one embodiment of the present invention, the pixel includes two sub-pixel groups which are adjacent to each other in the row direction, each of the sub-pixel groups including sub-pixels of three colors, cyan, magenta and yellow, periodically aligned in one direction; and a magenta sub-pixel included in the sub-pixel group is sandwiched along the row direction by a yellow sub-pixel and a cyan sub-pixel.

In one embodiment of the present invention, the pixel includes two sub-pixel groups which are adjacent to each other in the row direction, each of the sub-pixel groups including sub-pixels of five colors, red, green, blue, yellow and cyan, periodically aligned in one direction; and a blue sub-pixel included in the sub-pixel group is sandwiched along the row direction by a green sub-pixel and a yellow sub-pixel.

In this specification, "row direction" and "column direction" simply mean two directions which cross each other but do not necessarily mean the horizontal and vertical directions.

According to the present invention, deterioration of display quality, which would be caused by vertical stripes, can be suppressed with no increase in the cost of peripheral circuits.

DESCRIPTION OF THE PREFERRED EMBODIMENTS

Figure 1:
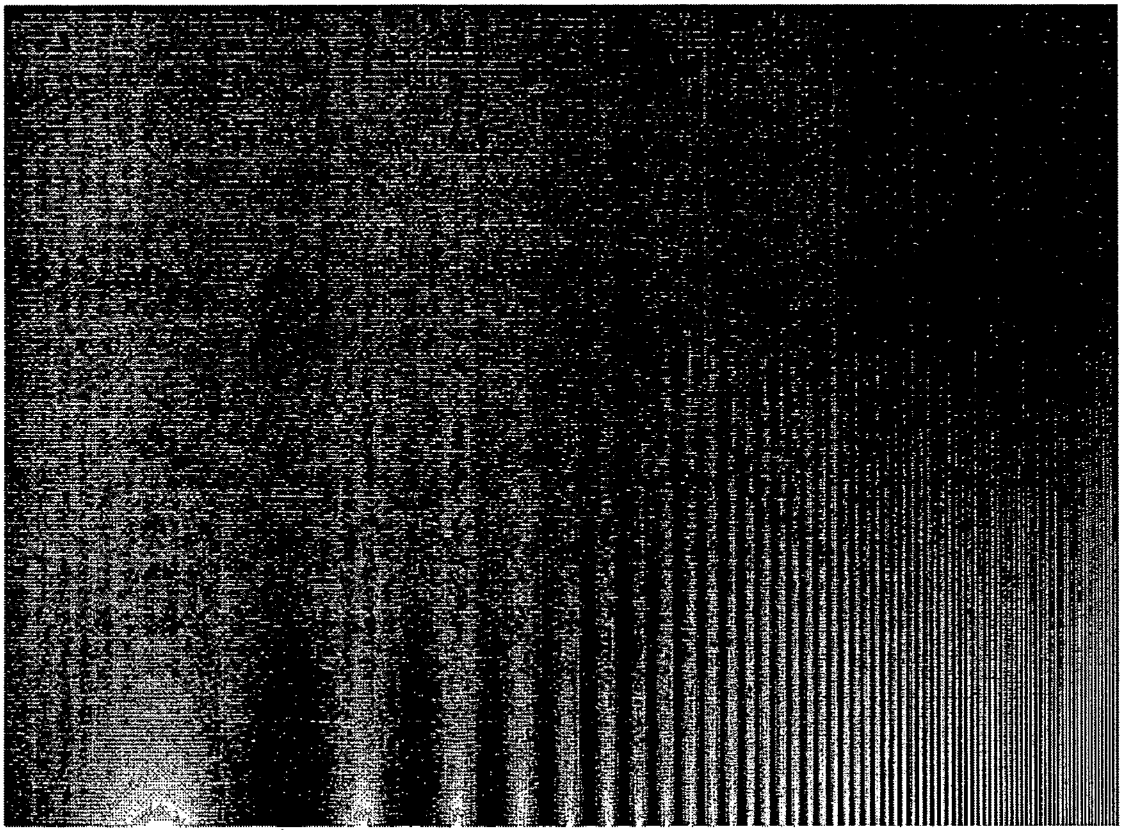
FIG. 1 is a so-called Campbell-Robson CSF Chart.
Figure 2:
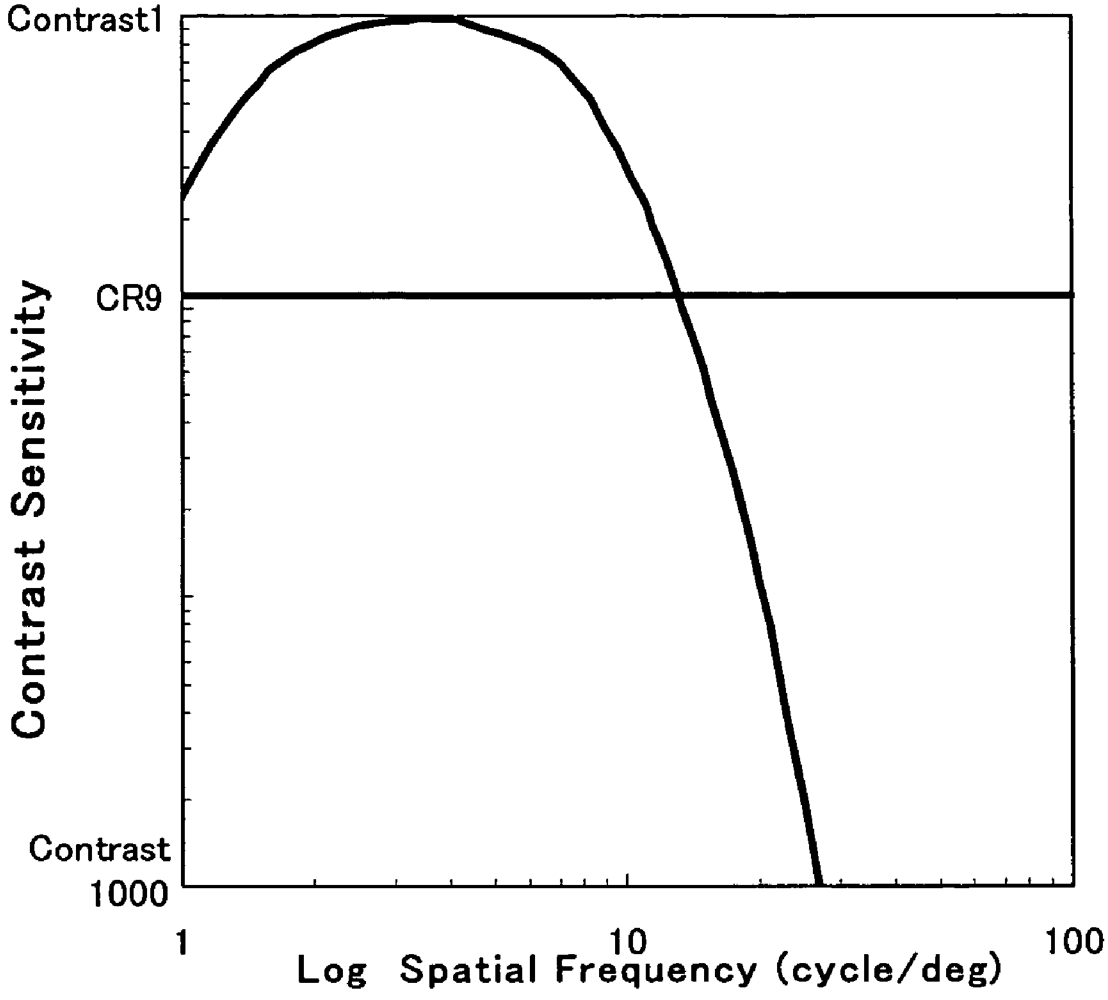
FIG. 2 is a graph illustrating a resolution limit curve measured using the Campbell-Robson CSF Chart.

Hereinafter, embodiments of the present invention will be described with reference to the drawings. The descriptions provided below are directed to a liquid crystal display device. However, the display device of the present invention includes not only a liquid crystal display device but also various display devices, such as an inorganic or organic EL display device, a PDP, a LED display device, a fluorescence display tube, a field emission display device, an electrophoretic display device, an electrochromic display device, a CRT display device, etc.

In the following descriptions, reference numerals formed by a number and a alphabetical character are sometimes presented without the alphabetical character (i.e., only with the number) in order to generically mention equivalent elements. For example, a first red sub-pixel 2*a* and a second red sub-pixel 2*b* are sometimes generically referred to as "red sub-pixel(s) 2".

Embodiment 1

Figure 3:
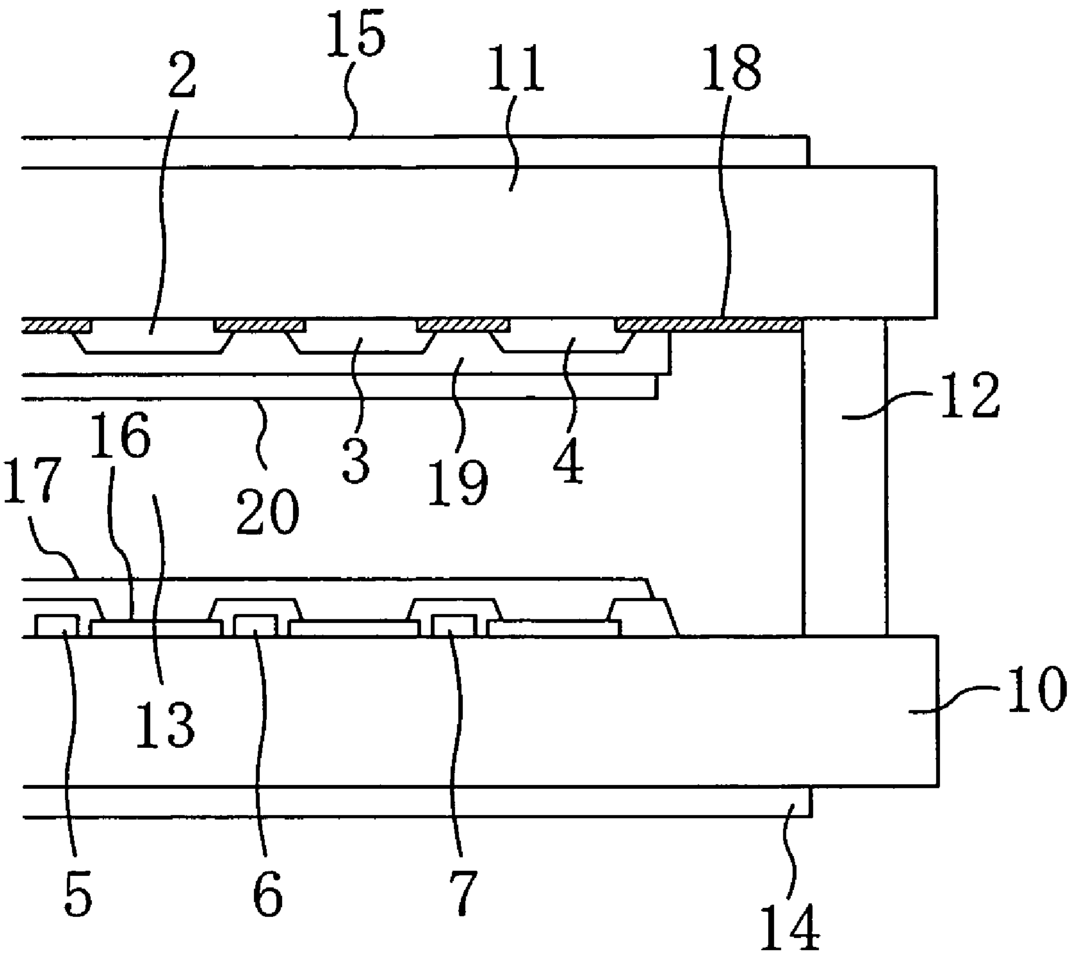
FIG. 3 is a schematic partial cross-sectional view showing a liquid crystal display device of embodiment 1.

FIG. 3 is a schematic partial cross-sectional view showing a liquid crystal display device of embodiment 1. The liquid crystal display device includes a liquid crystal panel, a driver circuit section for driving the liquid crystal panel, a backlight (if the liquid crystal display device is a transmissive LCD), etc. The liquid crystal panel includes a TFT (Thin Film Transistor) substrate 10, a CF (color filter) substrate 11 which faces the TFT substrate 10, a perimeter sealing member 12 interposed between the substrates 10 and 11, a liquid crystal layer 13 interposed between the substrates 10 and 11 and enclosed by the perimeter sealing member 12, and a pair of polarization plates 14 and 15 attached on the external surfaces of the substrates 10 and 11, respectively.

The TFT substrate 10 includes a plurality of scanning lines (not shown) extending in the row direction, a plurality of signal lines 5, 6 and 7 extending in the column direction to cross the scanning lines, TFTs (not shown) provided in the vicinity of the intersections of the scanning lines and signal lines 5, 6 and 7, transparent sub-pixel electrodes (hereinafter, also referred to as "sub-pixel electrode(s)") 16 arranged in a matrix and connected to the signal lines 5, 6 and 7 through the TFTs, and a liquid crystal alignment film 17 made of polyimide, or the like, which covers the transparent sub-pixel electrodes 16.

The CF substrate 11 includes color filter segments 2, 3 and 4 of three colors, red, green and blue, a light shield layer 18 made of chromium or black resin, a transparent common electrode 19 made of ITO (Indium Tin Oxide), or the like, and a liquid crystal alignment film 20 which covers the transparent common electrode 19.

Examples of the material of the substrates 10 and 11 include glasses, such as silica glass, soda lime glass, borosilicate glass, low alkali glass, and non-alkali glass, and the like, plastics, such as polyester, polyimide, and the like, and semiconductors, such as silicon, and the like.

A production process of the liquid crystal panel is now described. In the first place, a production method of the TFT substrate 10 is described. A thin film of Ta or TaMo alloy is formed over a glass substrate so as to have a thickness of about 100 to 200 nm by sputtering, and then, scanning lines are formed by photoetching so as to have a predetermined pattern. An insulating film is formed of SiNx, or the like, over the resultant structure. Thereafter, a-Si layer and an etching stopper layer (SiNx) are formed, and TFT elements are formed by photoprocessing. Then, a source metal film is formed of Ti, or the like, and signal lines 5, 6 and 7 having a predetermined pattern, drains, etc., are formed by photoetching. A protection film of Si, or the like, and a contact hole are formed. Thereafter, an ITO film is formed, and sub-pixel electrodes 16 are formed by photoetching. Over the thus-fabricated TFT substrate 10, a polyimide liquid crystal alignment film 17 is printed, and the resultant structure is baked. In general, the thickness of the liquid crystal alignment film 17 is in the range of 50 to 100 nm. Thereafter, the resultant structure is rubbed in one direction with rotating cloth.

Next, a production method of the CF substrate 11 is described. A black mask material of Cr or black resin is applied over a glass substrate, and a light shield layer 18 is formed by photoprocessing. For each of red, green and blue, coating of a color filter film and formation of a predetermined pattern by photoprocessing are performed, and the resultant structure is baked to form color filter segments 2, 3 and 4. An ITO film is formed through a mask to form a transparent common electrode 19. A liquid crystal alignment film 20 is formed over the CF substrate 11 in the same fashion as for the TFT substrate 10.

Spraying of spacers or printing of a perimeter sealing member 12 is performed on the TFT substrate 10 or the CF substrate 11. The substrates 10 and 11 are combined, and the resultant structure is baked. The combined substrate is divided into panel units, and then, a cell of the resultant panel is filled with TN (Twisted Nematic) liquid crystal material and sealed. Polarization plates 14 and 15 are attached onto the both sides of the panel before completion of a liquid crystal panel.

In the liquid crystal display device of embodiment 1, regions where the sub-pixel electrodes 16 are superposed over the transparent common electrode 19 which faces the transparent sub-pixel electrode 16 correspond to sub-pixels. Strictly, the regions to which a voltage is applied according to the state to be displayed and which correspond to the openings of the light shield layer 18 are defined as sub-pixels. Hereinafter, for convenience of illustration, sub-pixels corresponding to the color filter segments 2, 3 and 4 of three colors, red, green and blue, are referred to as a red sub-pixel 2, a green sub-pixel 3 and a blue sub-pixel 4, respectively. Further, the transparent sub-pixel electrode 16 is sometimes referred to simply as "sub-pixel". It should be noted that the display device of the present invention is not limited to an active matrix liquid crystal display device described in the example of embodiment 1, but may be a passive matrix liquid crystal display device, for example. In the passive matrix liquid crystal display device, each of the intersection regions of column electrodes of a stripe arrangement and row electrodes of a stripe arrangement is defined as a sub-pixel.

Figure 4:
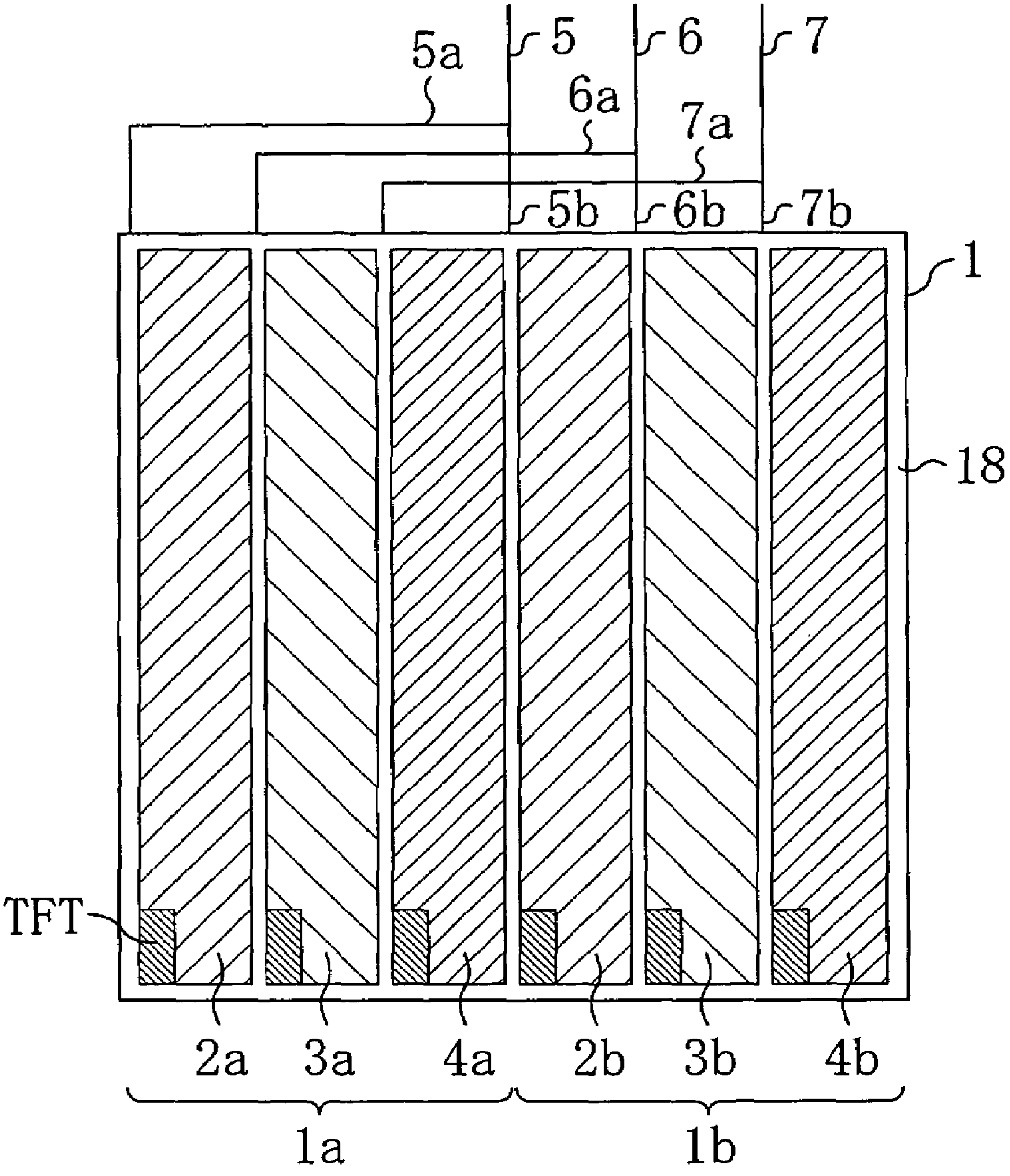
FIG. 4 shows a general structure of a pixel of the liquid crystal display device of embodiment 1.

FIG. 4 shows a general structure of a pixel of the liquid crystal display device of embodiment 1. The liquid crystal display device of embodiment 1 includes a plurality of pixels 1 arranged in a matrix. Each of the pixels 1 is formed by two sub-pixel groups 1*a* and 1*b* which are adjacent to each other in the row direction. Each of the sub-pixel groups 1*a* and 1*b* includes sub-pixels 2, 3 and 4 of three colors, red, green and blue, which are periodically aligned in one direction (in the row direction in this example). Specifically, first and second red sub-pixels 2*a* and 2*b*, first and second green sub-pixels 3*a* and 3*b*, and first and second blue sub-pixels 4*a* and 4*b* are included in each pixel 1. That is, each pixel 1 includes two sub-pixel regions for each color.

The liquid crystal display device of embodiment 1 is now described with an example of a 19.7-inch diagonal VGA class display having the resolution of 640×480. The size of one pixel is 680 μm×680 μm. Each of the sub-pixels 2, 3 and 4 has the shape of a strip. The width (length in the row direction) of each of the sub-pixels 2, 3 and 4 is about 113 μm, and the width of each of the sub-pixel groups 1*a* and 1*b* is about 340 μm (about 113 μm×3).

Figure 13:
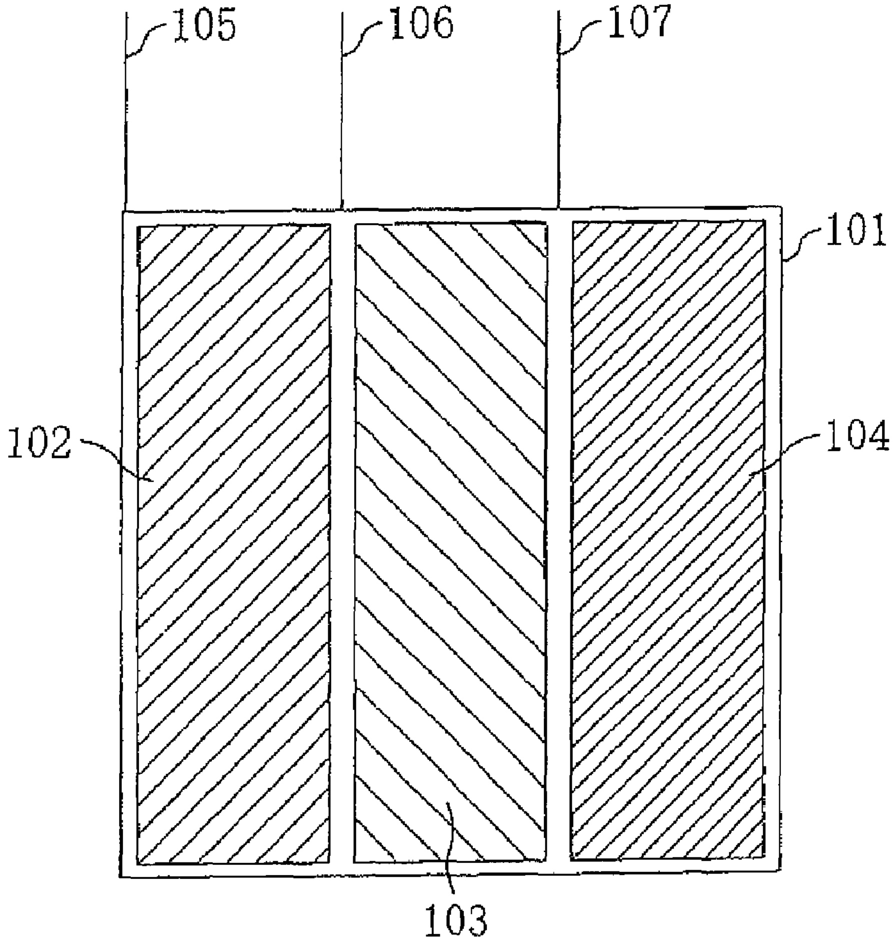
FIG. 13 is a general plan view of a commonly-employed pixel.

When the display is viewed from a position 50 cm distant therefrom, lines and spaces of yellow and blue at 25.7 cycle/degree are seen within a view field of 1°. In the case of the conventional display shown in FIG. 13, the lines and spaces are seen at 12.8 cycle/degree.

Figure 5:
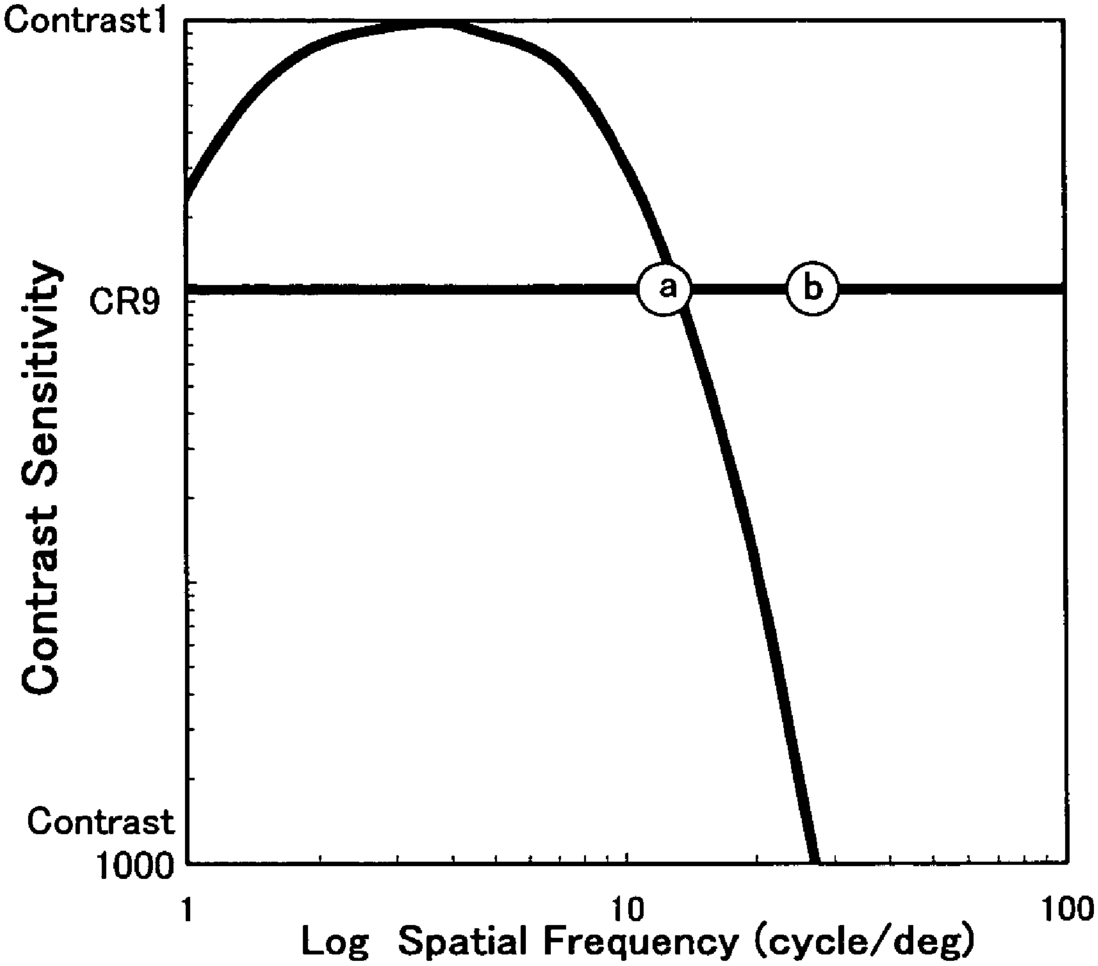
FIG. 5 is a graph illustrating a resolution limit curve in which the values of lines and spaces of the displays of embodiment 1 and a conventional example are shown.

FIG. 5 is a graph illustrating a resolution limit curve in which the values of lines and spaces of the displays of embodiment 1 and the conventional example are shown. In FIG. 5, point a indicates the value of the conventional example, and point b indicates the value of embodiment 1. As seen from FIG. 5, in the conventional example, the value of lines and spaces is within the resolution limit, so that vertical stripes of yellow and blue are perceived. In the example of embodiment 1, the value of lines and spaces exceeds the resolution limit, so that no vertical stripes are perceived.

The driver circuit section of embodiment 1 includes a liquid crystal controller (not shown) which performs signal processing based on an externally-input signal, a signal line driving circuit (not shown) which outputs a video signal according to an instruction from the liquid crystal controller, and a scanning line driving circuit (not shown) which outputs a scanning pulse according to an instruction from the liquid crystal controller. The liquid crystal controller is electrically connected to the liquid crystal panel through a TCP (Tape Carrier Package). The TCP incorporates the signal line driving circuit and the scanning line driving circuit.

The sub-pixels 2, 3 and 4 are electrically connected to corresponding signal lines 5, 6 and 7, respectively. Video signals transmitted through the signal lines 5, 6 and 7 are input to the sub-pixels 2, 3 and 4 through the corresponding TFTs. Specifically, scanning pulses from the scanning line driving circuit are applied to a plurality of scanning lines extending in the row direction in a sequential order (e.g., on a row by row basis) at every horizontal scanning interval. The video signals supplied from the signal line driving circuit through the signal lines 5, 6 and 7 are input to the corresponding sub-pixels 2, 3 and 4 through TFTs selected by the scanning pulses. It should be noted that, for simplicity of illustration, the signal lines 5, 6 and 7 extending between sub-pixels are not shown in FIG. 4.

In embodiment 1, the video signal output from the signal line driving circuit is branched into two lines for driving two sub-pixels of the same color in a pixel. In other words, sub-pixels of the same color in a pixel are driven by the same signal. Specifically, the red sub-pixel signal line 5 for supplying the video signal to the red sub-pixels 2 is branched into two signal lines 5*a* and 5*b* outside the display region (active area) on the TFT substrate 10. The two signal lines 5*a* and 5*b* are electrically connected to the transparent sub-pixel electrodes 16 of the first and second red sub-pixels 2*a* and 2*b*. With this structure, one video signal output from the signal line driving circuit is divided into two signals for driving the first and second red sub-pixels 2*a* and 2*b*. The green sub-pixel signal line 6 and the blue sub-pixel signal line 7 are also branched into two signal lines 6*a* and 6*b* and two signal lines 7*a* and 7*b*, respectively.

With the structure where one video signal output from the signal line driving circuit is divided into two signals, deterioration of the display quality due to the stripes is reduced, and the number of outputs of the signal line driving circuit is the same as that of the conventional one. Thus, an increase in the cost of peripheral circuits is avoided.

The signal line can be branched in the vicinity of a terminal section of the signal line driving circuit. In this case, an intersection of a branched signal line and another signal line is formed. This is described in detail with reference to FIG. 4. For example, an intersection is formed by the first green sub-pixel signal line 6*a* branched from the green sub-pixel signal line 6 and the second red sub-pixel signal line 5*b* branched from the red sub-pixel signal line 5. In order to avoid a short-circuit at the intersection of the signal lines 6*a* and 5*b*, it is possible, for example, that an insulating film is formed on the second red sub-pixel signal line 5*b*, and the first green sub-pixel signal line 6*a* is formed to extend across over the insulating film. However, in this method, it is necessary to perform the patterning step for the source metal twice, and therefore, the production cost increases. A method for avoiding a short-circuit at the intersection of the signal lines 6*a* and 5*b* in the above TFT production process, i.e., without adding a new process, is described with reference to FIG. 6.

Figure 6A:
FIGS. 6A, 6B and 6C are schematic plan views illustrating the production process of an intersectional portion of a signal line 6*a* for a first green sub-pixel and a signal line 5*b* for a second red sub-pixel.
Figure 6B:
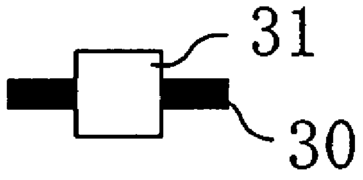
Figure 6C:
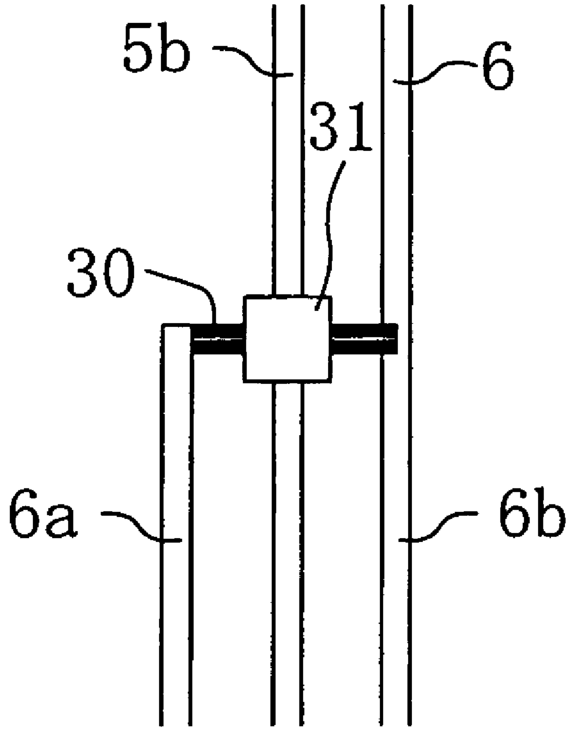

FIGS. 6A, 6B and 6C are schematic plan views illustrating the production process of an intersectional portion of a first green sub-pixel signal line 6*a* and a second red sub-pixel signal line 5*b*. In the first place, as shown in FIG. 6A, a connection portion 30 of the green sub-pixel signal line 6 and the first green sub-pixel signal line 6*a* is formed using gate metal at the same time with the formation of the scanning lines. Then, as shown in FIG. 6B, an interlayer dielectric 31 is formed in a region where the signal line 5*b* is to extend across over the connection portion 30 at the same time with the patterning of a gate insulator. Then, signal lines 5, 6 and 7 are formed from the source metal. At this step, as shown in FIG. 6C, the source metal is patterned such that the signal lines 6 and 6*a* are connected through the connection portion 30 and the signal line 5*b* extends across over the interlayer dielectric 31. It should be noted that, although the connection portion 30 is exposed except for the region of the interlayer dielectric 31 in the example of FIG. 6, the connection portion 30 may be covered with the gate insulator while the signal lines 6 and 6*a* are connected to the connection portion 30 through contact holes.

In embodiment 1, branching points of wires are formed in a frame region which exists between the connection terminals of the signal line driving circuit and the active area, but the present invention is not limited thereto. For example, if there is no room in area over the glass substrate, the branching points may be formed in the signal line driving circuit or in the TCP.

Next, a method for driving the liquid crystal display device of embodiment 1 is described. The liquid crystal display device needs to be driven with an alternating voltage because of its display characteristics, and thus, the voltage polarity (positive/negative) is inverted at every refresh of an input signal. Further, in order that the alternating component is not recognized as a flicker, the polarity-inverted driving is performed such that the voltage polarity (positive/negative) is opposite between adjacent sub-pixels. The patterns of polarity inversion include a line-inverted driving mode where the polarity is inverted every other scanning line or every other signal line and a dot-inverted driving mode where the polarity is inverted every other sub-pixel. As a variation of the dot-inverted driving mode, there is a 2H dot-inverted mode where the polarity is inverted every other sub-pixel along the scanning line while the polarity is inverted every other two sub-pixels along the signal line (at every signal of two horizontal scanning intervals). These dot-inverted driving modes are highly resistant to crosstalk, and therefore, high display quality is readily achieved.

However, in the liquid crystal display device of embodiment 1 where six sub-pixels 2, 3 and 4 (red, green, blue, red, green, blue) constitute one pixel, the polarity of a signal output from the driving circuit needs to be further inverted for the dot-inverted driving mode where the polarity pattern is "+•−•+•−•+•−" for the sub-pixels which are the units of polarity inversion. For example, in order to supply a positive voltage to the signal line 5*a* for the first red sub-pixel 2*a* and a negative voltage to the signal line 5*b* for the second red sub-pixel 2*b*, it is necessary to invert the polarity of a signal output from the signal line driving circuit for any one of the signal lines 5*a* and 5*b*.

The example of embodiment 1 employs the two polarity inversion patterns "+•−•+•+•−•+" and "−•+•−•−•+•−" in the pixel 1. These two patterns are preferably adjacent to each other in the row direction. In other words, it is preferable that, in two pixels 1 adjoining in the row direction, 6 sub-pixels included in one of the pixels 1 have the polarity pattern of "+•−•+•+•−•+" while 6 sub-pixels included in the other pixel 1 have the polarity pattern of "−•+•−•−•+•−". With this arrangement, the sub-pixels adjoining at the interface between the pixels 1 have opposite polarities. As a result, a flicker is unlikely to be perceived, and shadowing (crosstalk through a power supply line) is prevented.

Figure 7:
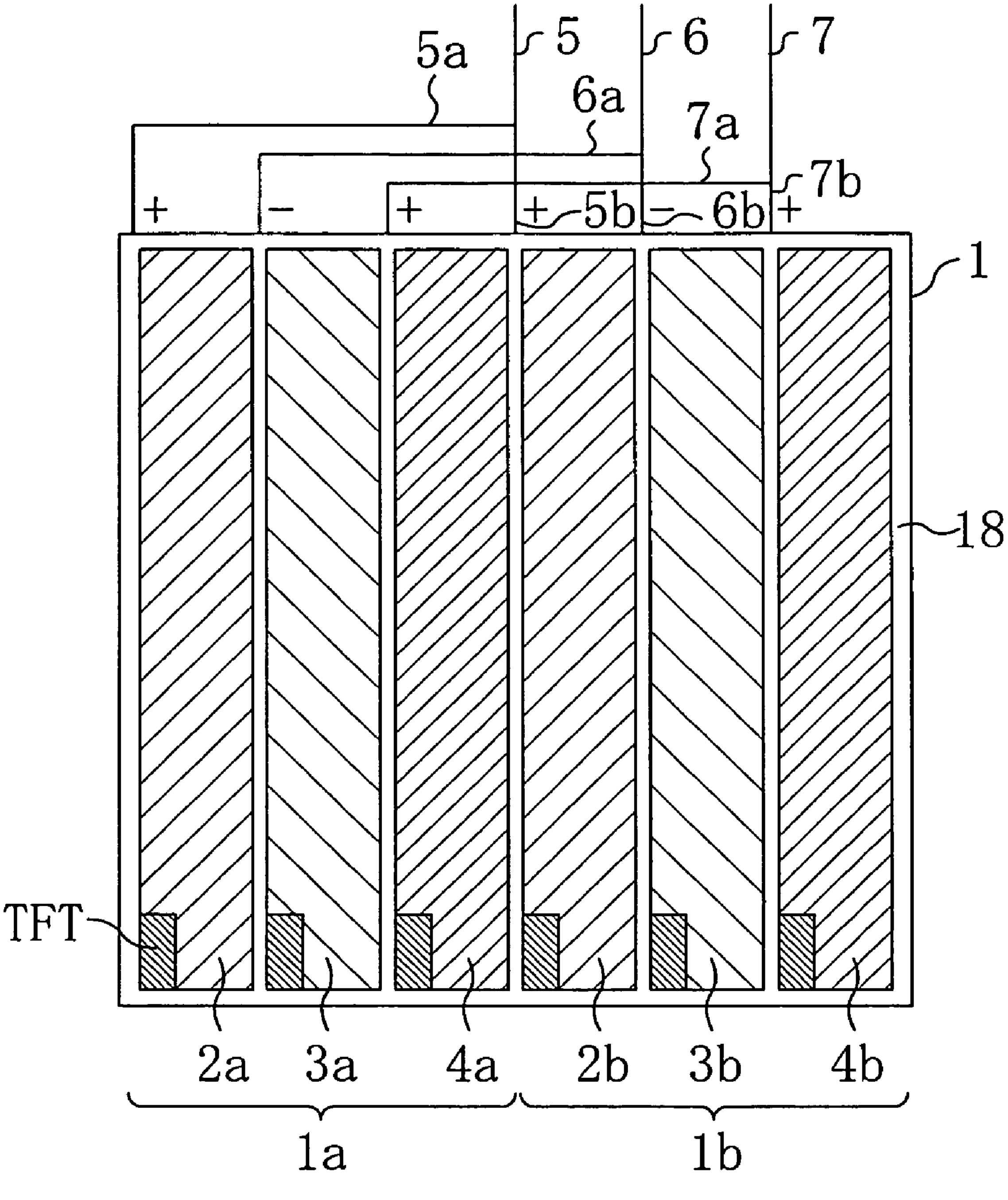
FIG. 7 shows the polarity of sub-pixels included in a pixel.

FIG. 7 shows the polarity of sub-pixels included in each pixel. In the pixel 1 shown in FIG. 7, the sub-pixels have the polarity of "+•−•+•+•−•+" from the sub-pixel 2*a* at the left side. In other words, FIG. 7 shows that signals (voltages) of the positive polarity are applied to the first and second red sub-pixels 2*a* and 2*b* through the red sub-pixel signal line 5 and to the first and second blue sub-pixels 4*a* and 4*b* through the blue sub-pixel signal line 7, whereas a signal (voltage) of the negative polarity is applied to the first and second green sub-pixels 3*a* and 3*b* through the green sub-pixel signal line 6.

The polarity pattern shown in FIG. 7 is obtained when the TFTs connected to the sub-pixels 2, 3 and 4 are on, i.e., during a horizontal scanning interval. Rectangular waves having certain amplitudes are applied from the signal lines 5, 6 and 7 to the sub-pixels 2, 3 and 4 according to the scans of scanning lines connected to TFTs which are on. The polarities of the sub-pixels 2, 3 and 4 are inverted at a predetermined frequency, e.g., at every field interval.

In the plan view, the sub-pixels 2, 3 and 4 are interposed between the signal lines 5, 6 and 7 which are adjacent in the row direction. Among the six sub-pixels 2, 3 and 4 included in one pixel, the first blue sub-pixel 4*a* is interposed between the signal lines 7*a* and 5*b* through which voltages of the same polarity (positive (+) in FIG. 7) are supplied. On the other hand, the other five sub-pixels 2*a*, 2*b*, 3*a*, 3*b* and 4*b* are each interposed between the signal lines 5, 6 and 7 through which voltages of opposite polarities are supplied. For example, the first red sub-pixel 2*a* is interposed between the signal line 5*a* of the positive polarity and the signal line 6*a* of the negative polarity.

Due to the coupling capacity of the signal lines 5, 6 and 7 and the sub-pixels 2, 3 and 4, the superposed voltage of [the effective value of the voltage on a signal line for a sub-pixel electrode over one field interval]×[the capacitance between the sub-pixel electrode and the signal line]÷[the total capacitance of the sub-pixels] is applied to the liquid crystal layer 13. Herein, the effective value of the voltage on a signal line for a sub-pixel electrode over one field interval is determined with respect to the potential of the signal line when the TFTs are off (reference potential). That is, in the case where the voltages on the sub-pixel electrode and the signal line have the same polarity, the effective value decreases. In the case where the voltages on the sub-pixel electrode and the signal line have the opposite polarities, the effective value increases.

Figure 8:
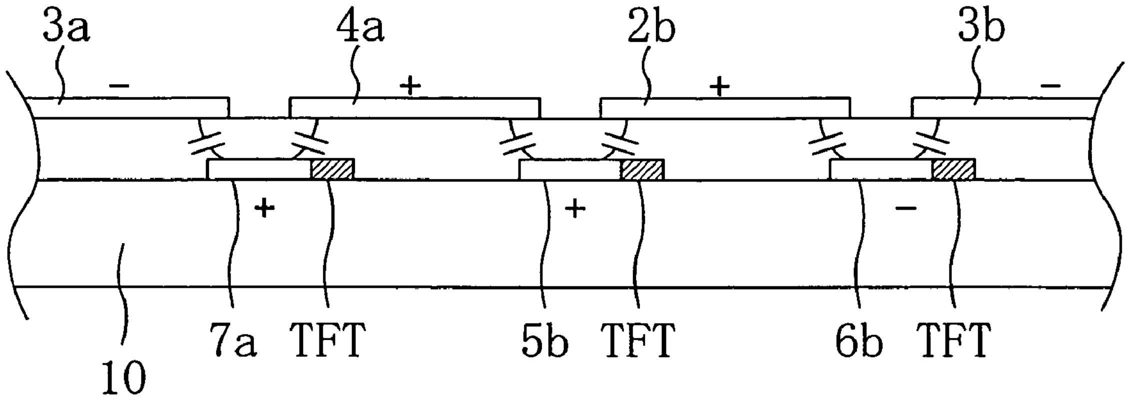
FIG. 8 is a schematic partial cross-sectional view of a TFT substrate 10.

FIG. 8 is a schematic partial cross-sectional view of the TFT substrate 10. As shown in FIG. 8, the signal line 5*b* and the signal line 6*b* which are coupled to the second red sub-pixel 2*b* have the opposite polarities, while the signal line 7*a* and the signal line 5*b* which are coupled to the first blue sub-pixel 4*a* have the same polarity (positive). In the case where each of the sub-pixel groups 1*a* and 1*b* includes an odd number of sub-pixels (three sub-pixels in embodiment 1), one of the sub-pixels 2*a*, 3*a* and 4*a* included in the first sub-pixel group 1*a* which is closest to the second sub-pixel group 1*b* (the first blue sub-pixel 4*a* in embodiment 1) is interposed between signal lines of the same polarity.

Thus, in the first blue sub-pixel 4*a*, the effective voltage applied to the liquid crystal layer 13 is lower than those applied in the other sub-pixels (e.g., the second red sub-pixel 2*b*). Therefore, in the case of the stripe arrangement, there is a possibility of a display defect in a vertical line (extending in the column direction) which includes the first blue sub-pixel 4*a*. Specifically, in the case of a normally white mode display device, there is a possibility that the vertical line results in a bright line. In the case of a normally black mode display device, there is a possibility that the vertical line results in a black line. It should be noted that a bright line in black display is more conspicuously perceived than a black line in white display and therefore causes a greater adverse effect on the display quality.

However, the luminosity factor of blue is lower that those of red and green, and therefore, the decreased effective voltage is unlikely to cause a problem in display. For example, when the amplitude of a signal line is 6 V, the difference in the effective voltage is about 0.2 V, which is converted to a brightness difference of about 20%. However, the 20% brightness difference in blue results in a luminosity factor equivalent to that resulting from a ⅙ of the 20% brightness difference in green. Therefore, the brightness difference in blue is only about 3% for a human eye. Thus, a blue sub-pixel is interposed between signal lines of the same polarity, whereby deterioration of display quality which would be caused by a decrease in the effective voltage is suppressed.

Embodiment 2

In a liquid crystal display device of the present invention, a sub-pixel which is interposed between signal lines of the same polarity may have a different aperture ratio from that of another sub-pixel of the same color included in the same pixel. For example, in the case where the aperture ratio of a sub-pixel interposed between signal lines of the same polarity is relatively high, occurrence of a black line is suppressed in a normally black mode display device. In the case where the aperture ratio of a sub-pixel interposed between signal lines of the same polarity is relatively low, occurrence of a bright line is suppressed in a normally white mode display device.

Figure 9:
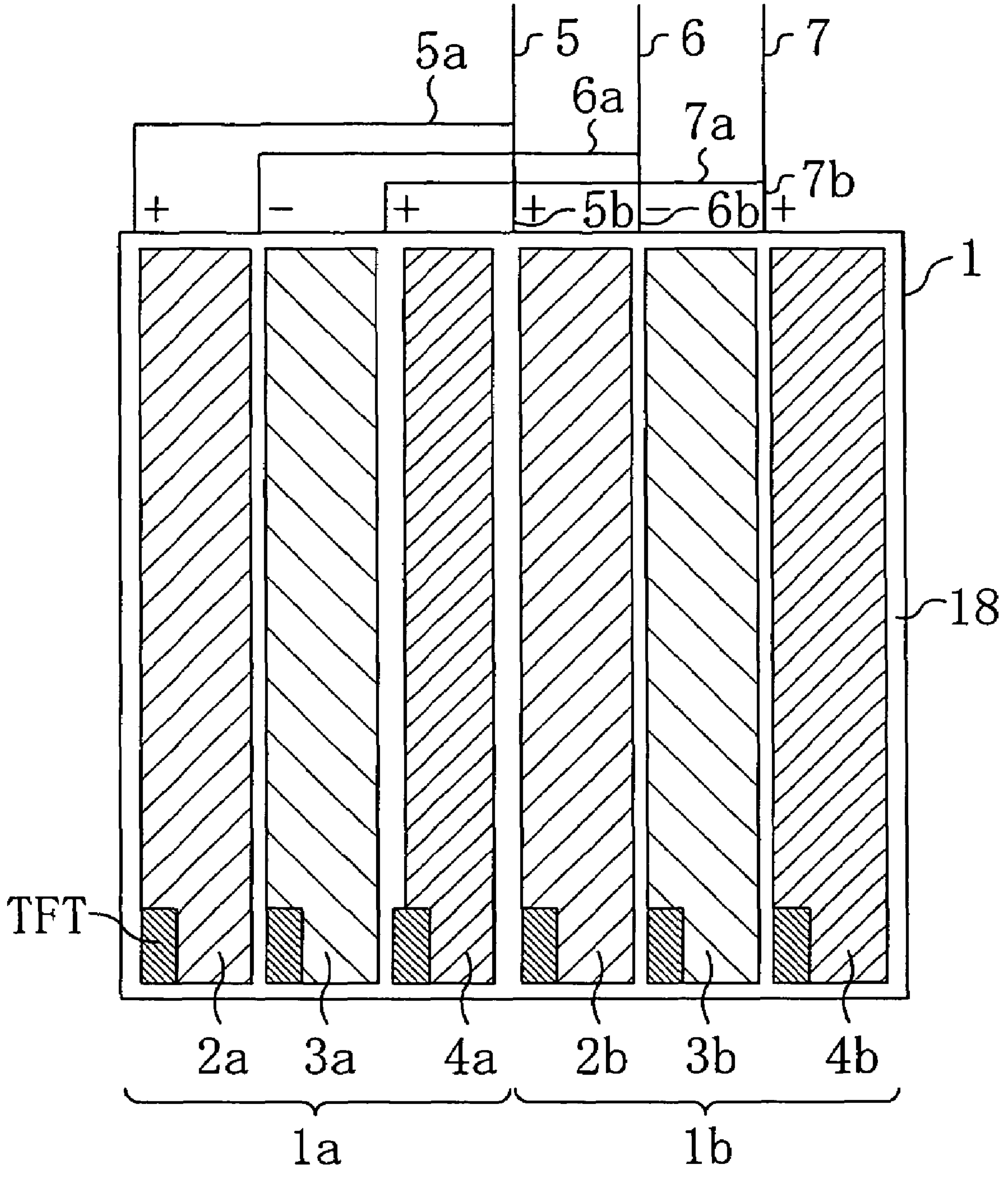
FIG. 9 shows a general structure of a pixel of a liquid crystal display device of embodiment 2.

FIG. 9 shows a general structure of a pixel of a liquid crystal display device of embodiment 2. It should be noted that, in FIG. 9 and subsequent drawings, components having substantially the same functions as those of the liquid crystal display device of embodiment 1 are denoted by the same reference numerals, and descriptions thereof are omitted.

In the liquid crystal display device of embodiment 2, the first blue sub-pixel 4*a* interposed between the signal lines 7*a* and 5*b* of the same polarity which are neighboring to each other in the row direction has an aperture ratio lower than that of the second blue sub-pixel 4*b* of the same color included in the same pixel 1. Specifically, the aperture ratio of the first blue sub-pixel 4*a* is lower than that of the second blue sub-pixel 4*b* by 10% to 30%, e.g., by about 20%.

In the liquid crystal display device of embodiment 2, the first blue sub-pixel 4*a* interposed between the signal lines 7*a* and 5*b* of the same polarity has a relatively low aperture ratio. Thus, in the case where this liquid crystal display device is applied to a normally white mode display device, occurrence of a bright line is suppressed as compared with the display device of embodiment 1.

Embodiment 3

In the examples described in embodiments 1 and 2, each of the sub-pixel groups 1*a* and 1*b* is formed by sub-pixels 2, 3 and 4 of three colors, red, green and blue. However, according to the present invention, the hues of the sub-pixels are not limited to the above. In an example of embodiment 3, each of the sub-pixel groups 1*a* and 1*b* is formed by sub-pixels of other three colors, cyan, magenta and yellow.

Figure 10:
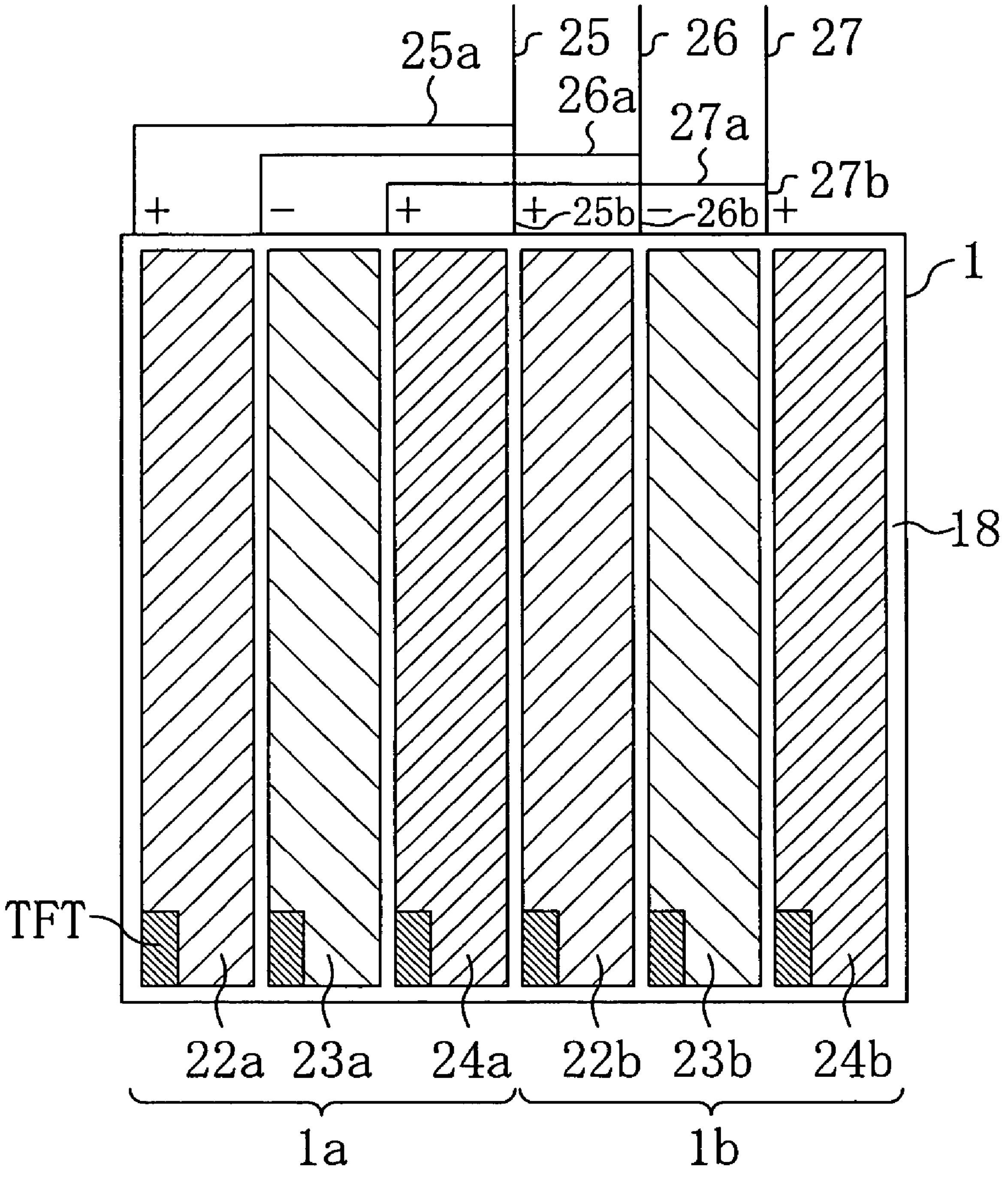
FIG. 10 shows a general structure of a pixel of a liquid crystal display device of embodiment 3.

FIG. 10 shows a general structure of a pixel of a liquid crystal display device of embodiment 3 where the polarity of each sub-pixel included in the pixel is shown. Also in embodiment 3, each pixel 1 is formed by two sub-pixel groups 1*a* and 1*b* which are adjacent to each other in the row direction as in embodiments 1 and 2. Each of the sub-pixel groups 1*a* and 1*b* includes sub-pixels 22, 23 and 24 of three colors, yellow, cyan and magenta, which are periodically aligned in one direction (in the row direction in this example). Specifically, first and second yellow sub-pixels 22*a* and 22*b*, first and second cyan sub-pixels 23*a* and 23*b*, and first and second magenta sub-pixels 24*a* and 24*b* are included in each pixel 1.

Also in embodiment 3, sub-pixels of the same color in each pixel 1 are driven by the same signal. Specifically, the yellow sub-pixel signal line 25 for supplying the video signal to the yellow sub-pixels 22 is branched into two signal lines 25*a* and 25*b*. With this structure, one video signal is divided into two signals for driving the first and second yellow sub-pixels 22*a* and 22*b*. The cyan sub-pixel signal line 26 and the magenta sub-pixel signal line 27 are also branched into two signal lines 26*a* and 26*b* and two signal lines 27*a* and 27*b*, respectively. With this structure, one video signal is divided into: two signals for driving the sub-pixels 23 or 24 of the same color.

In the pixel 1 shown in FIG. 10, the sub-pixels have the polarity of "+•−•+•+•−•+" from the sub-pixel 22*a* at the left side. In other words, FIG. 10 shows that signals (voltages) of the positive polarity are applied to the first and second yellow sub-pixels 22*a* and 22*b* through the yellow sub-pixel signal line 25 and to the first and second magenta sub-pixels 24*a* and 24*b* through the magenta sub-pixel signal line 27, whereas a signal (voltage) of the negative polarity is applied to the first and second cyan sub-pixels 23*a* and 23*b* through the cyan sub-pixel signal line 26. That is, the first magenta sub-pixel 24*a* is interposed between the signal lines 27*a* and 25*b* through which voltages of the same polarity (positive (+) in FIG. 10) are supplied, whereas the other five sub-pixels 22*a*, 22*b*, 23*a*, 23*b* and 24*b* are each interposed between the signal lines 25, 26 and 27 through which voltages of opposite polarities are supplied. For example, the first yellow sub-pixel 22*a* is interposed between the signal line 25*a* of the positive polarity and the signal line 26*a* of the negative polarity. Thus, in the first magenta sub-pixel 24*a*, the effective voltage applied to the liquid crystal layer 13 is lower than those applied in the other sub-pixels (e.g., the second magenta sub-pixel 24*b*). Therefore, in the case of the stripe arrangement, there is a possibility of a display defect in a vertical line (extending in the column direction) which includes the first magenta sub-pixel 24*a*.

However, the luminosity factor of magenta is lower that those to yellow and cyan. In other words, the magenta sub-pixels 24 have the lowest luminosity factor among the sub-pixels 22, 23 and 24 which constitute the sub-pixel groups 1*a* and 1*b*. Therefore, even when the effective voltage in the first magenta sub-pixel 24*a* is decreased, such a decrease is unlikely to cause a problem in display. Thus, a magenta sub-pixel is interposed between signal lines of the same polarity, whereby deterioration of display quality which would be caused by a decrease in the effective voltage is suppressed.

In the above example of embodiment 3, the first magenta sub-pixel 24*a*, which is interposed between signal lines of the same polarity, has substantially the same aperture ratio as that of the second magenta sub-pixel 24*b* included in the same pixel 1, but the first magenta sub-pixel 24*a* and the second magenta sub-pixel 24*b* may have different aperture ratios as in embodiment 2. For example, the aperture ratio of the first magenta sub-pixel 24*a* may be lower than that of the second magenta sub-pixel 24*b* by 10% to 30% (e.g., about 20%).

Also in embodiment 3, it is preferable that the two polarity inversion patterns "+•−•+•+•−•+" and "−•+•−•−•+•−" are employed in the pixel 1, and these two patterns are adjacent to each other in the row direction. With this arrangement, the sub-pixels adjoining at the interface between the pixels 1 have opposite polarities. As a result, a flicker is unlikely to be perceived, and shadowing (crosstalk through a power supply line) is prevented.

Embodiment 4

In the examples described in embodiments 1 to 3, each of the sub-pixel groups 1*a* and 1*b* is formed by sub-pixels 2, 3 and 4 of three colors. However, according to the present invention, the number of hues of the sub-pixels is not limited to the above. In an example of embodiment 4, each of the sub-pixel groups 1*a* and 1*b* is formed by sub-pixels of four colors, red, green, blue and white.

Figure 11:
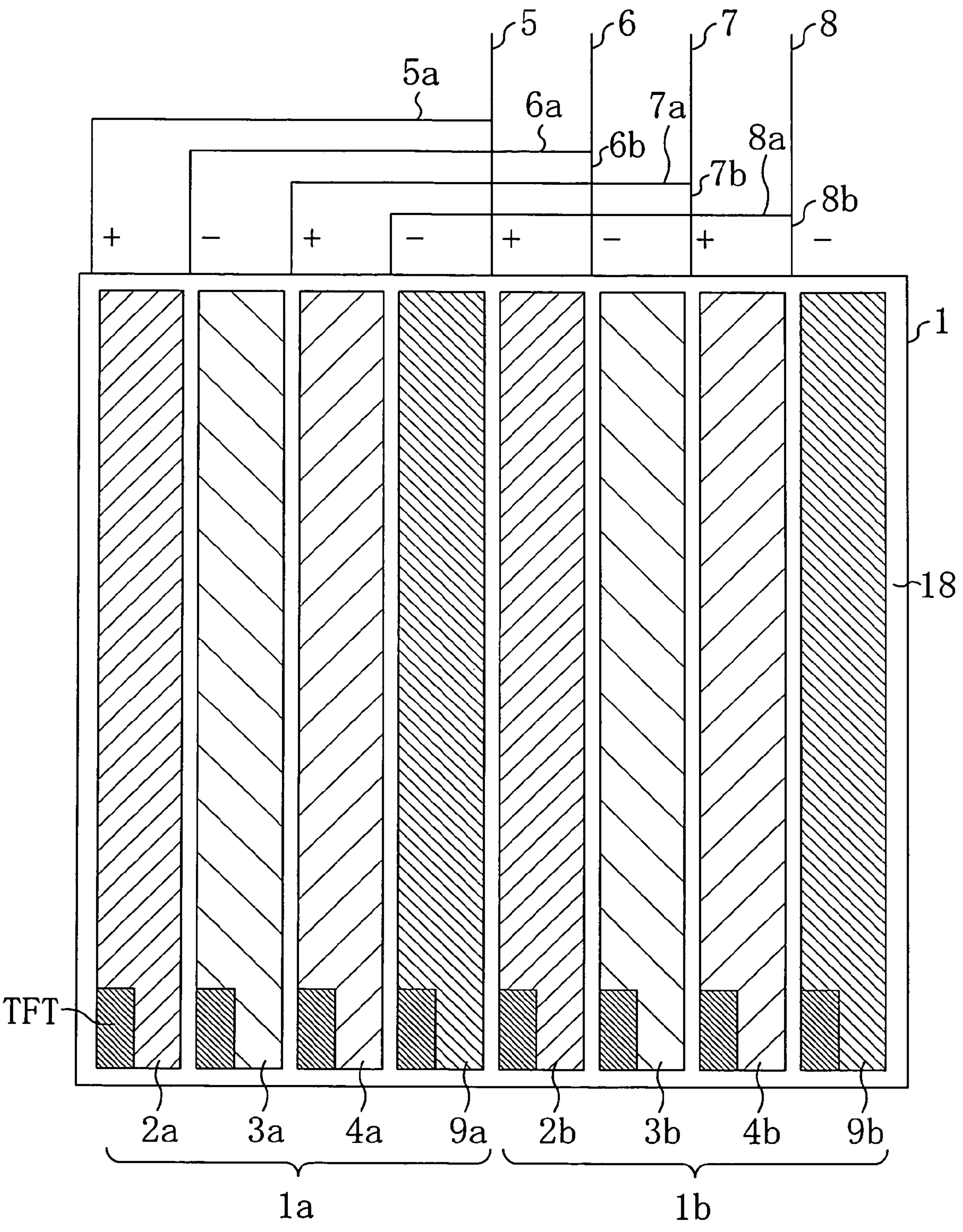
FIG. 11 shows a general structure of a pixel of a liquid crystal display device of embodiment 4.

FIG. 11 shows a general structure of a pixel of a liquid crystal display device of embodiment 4 where the polarity of each sub-pixel included in the pixel is shown. Also in embodiment 4, each pixel 1 is formed by two sub-pixel groups 1*a* and 1*b* which are adjacent to each other in the row direction as in embodiments 1 to 3. Each of the sub-pixel groups 1*a* and 1*b* includes sub-pixels 2, 3, 4 and 9 of four colors, red, green, blue and white, which are periodically aligned in one direction (in the row direction in this example). Specifically, first and second red sub-pixels 2*a* and 2*b*, first and second green sub-pixels 3*a* and 3*b*, first and second blue sub-pixels 4*a* and 4*b*, and first and second white sub-pixels 9*a* and 9*b* are included in each pixel 1.

Also in embodiment 4, sub-pixels of the same color in each pixel 1 are driven by the same signal. Specifically, the red sub-pixel signal line 5, the green sub-pixel signal line 6, the blue sub-pixel signal line 7, and the white sub-pixel signal line 8 are each branched into two signal lines, i.e., signal lines 5*a* and 5*b*, signal lines 6*a* and 6*b*, signal lines 7*a* and 7*b*, and signal lines 8*a* and 8*b*, respectively. With this structure, one video signal is divided into two signals for driving the sub-pixels of the same color.

In embodiment 4, the two polarity inversion patterns "+•–•+•–•+•–•+•–" and "–•+•–•+•–•+•–•+" are employed in the pixel 1. These two patterns are preferably adjacent to each other in the row direction. In other words, it is preferable that, in two pixels 1 adjoining in the row direction, 8 sub-pixels 2, 3, 4 and 9 included in one of the pixels 1 have the polarity pattern of "+•–•+•–•+•–•+•–" while 8 sub-pixels 2, 3, 4 and 9 included in the other pixel 1 have the polarity pattern of "–•+•–•+•–•+•–•+". With this arrangement, the sub-pixels adjoining at the interface between the pixels 1 have opposite polarities. As a result, a flicker is unlikely to be perceived, and shadowing (crosstalk through a power supply line) is prevented.

In the pixel 1 shown in FIG. 11, the sub-pixels have the polarity pattern of "+•–•+•–•+•–•+•–" from the sub-pixel 2*a* at the left side. In other words, the sub-pixels 2, 3, 4 and 9 are each interposed between the signal lines 5, 6, 7 and 8 through which the voltages of opposite polarities are input. Thus, in embodiment 4, a display defect due to a decreased effective voltage is unlikely to occur.

In embodiment 4, each of the sub-pixel groups 1*a* and 1*b* is formed by the sub-pixels of four colors, red, green, blue and white. The luminosity factors of these four colors have the relationship of "white>green>red>blue". Thus, a stripe is visually perceived between the white sub-pixel 9 having the highest luminosity factor and the blue sub-pixel 4 having the lowest luminosity factor. In embodiment 4, as shown in FIG. 11, the blue sub-pixel 4 having the lowest luminosity factor is interposed between (i.e., sandwiched by) the white sub-pixel 9 having the highest luminosity factor and the green sub-pixel 3 having the second highest luminosity factor. With this arrangement, the stripe is unlikely to be visually perceived.

Embodiment 5

Figure 12:
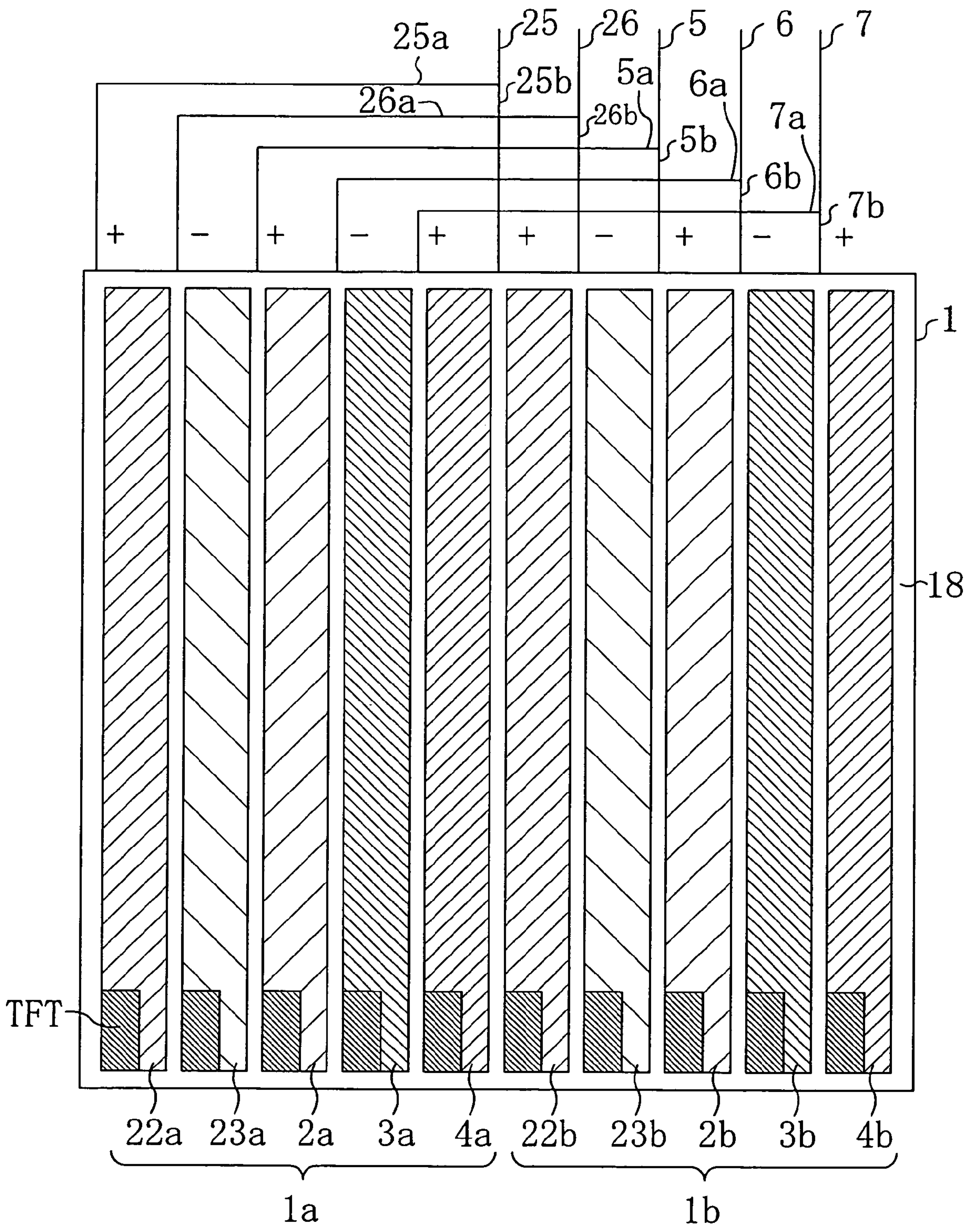
FIG. 12 shows a general structure of a pixel of a liquid crystal display device of embodiment 5.

In an example of embodiment 5, each of the sub-pixel groups 1*a* and 1*b* is formed by sub-pixels of five colors, red, green, blue, yellow and cyan. FIG. 12 shows a general structure of a pixel of a liquid crystal display device of embodiment 5 where the polarity of each sub-pixel included in the pixel is shown.

Also in embodiment 5, each pixel 1 is formed by two sub-pixel groups 1*a* and 1*b* which are adjacent to each other in the row direction as in embodiments 1 to 4. Each of the sub-pixel groups 1*a* and 1*b* includes sub-pixels 22, 23, 2, 3 and 4 of five colors, yellow, cyan, red, green and blue, which are periodically aligned in one direction (in the row direction in this example). Specifically, first and second yellow sub-pixels 22*a* and 22*b*, first and second cyan sub-pixels 23*a* and 23*b*, first and second red sub-pixels 2*a* and 2*b*, first and second green sub-pixels 3*a* and 3*b* and first and second blue sub-pixels 4*a* and 4*b* are included in each pixel 1.

Also in embodiment 5, sub-pixels of the same color in each pixel 1 are driven by the same signal. Specifically, the yellow sub-pixel signal line 25 for supplying a video signal to the yellow sub-pixels 22 is branched into two signal lines 25*a* and 25*b*. With this structure, one video signal is divided into two signals for driving the first and second yellow sub-pixels 22*a* and 22*b*. The cyan sub-pixel signal line 26, the red sub-pixel signal line 5, the green sub-pixel signal line 6, and the blue sub-pixel signal line 7 are also each branched into two signal lines, i.e., signal lines 26*a* and 26*b*, signal lines 5*a* and 5*b*, signal lines 6*a* and 6*b*, and signal lines 7*a* and 7*b*, respectively. With this structure, one video signal is divided into two signals for driving the sub-pixels (23, 2, 3, 4) of the same color.

In embodiment 5, the two polarity inversion patterns "+•–•+•–•+•+•–•+•–•+" and "–•+•–•+•–•–•+•–•+•–" are employed in the pixel 1. These two patterns are preferably adjacent to each other in the row direction. In other words, it is preferable that, in two pixels 1 adjoining in the row direction, 10 sub-pixels 22, 23, 2, 3 and 4 included in one of the pixels 1 have the polarity pattern of "+•–•+•–•+•+•–•+•–•+" while 10 sub-pixels 22, 23, 2, 3 and 4 included in the other pixel 1 have the polarity pattern of "–•+•–•+•–•–•+•–•+•–". With this arrangement, the sub-pixels adjoining at the interface between the pixels 1 have opposite polarities. As a result, a flicker is unlikely to be perceived, and shadowing (crosstalk through a power supply line) is prevented.

In the pixel 1 shown in FIG. 12, the sub-pixels have the polarity of "+•–•+•–•+•+•–•+•–•+" from the sub-pixel 22*a* at the left side. In other words, signals (voltages) of the positive polarity are applied to the first and second yellow sub-pixels 22*a* and 22*b* through the yellow sub-pixel signal line 25, to the first and second red sub-pixels 2*a* and 2*b* through the red sub-pixel signal line 5, and to the first and second blue sub-pixels 4*a* and 4*b* through the blue sub-pixel signal line 7. On the other hand, signals (voltages) of the negative polarity are applied to the first and second cyan sub-pixels 23*a* and 23*b* through the cyan sub-pixel signal line 26 and to the first and second green sub-pixels 3*a* and 3*b* through the green sub-pixel signal line 6. That is, the first blue sub-pixel 4*a* is interposed between the signal lines 7*a* and 25*b* through which voltages of the same polarity (positive (+) in FIG. 12) are supplied, whereas the other nine sub-pixels 22*a*, 22*b*, 23*a*, 23*b*, 2*a*, 2*b*, 3*a*, 3*b* and 4*b* are each interposed between the signal lines 25, 26, 5, 6 and 7 through which voltages of opposite polarities are supplied. Thus, in the first blue sub-pixel 4*a*, the effective voltage applied to the liquid crystal layer 13 is lower than those applied in the other sub-pixels (e.g., the second blue sub-pixel 4*b*). Therefore, in the case of the stripe arrangement, there is a possibility of a display defect in a vertical line (extending in the column direction) which includes the first blue sub-pixel 4*a*.

However, the blue sub-pixels 4 have the lowest luminosity factor among the sub-pixels 22, 23, 2, 3 and 4 which constitute the sub-pixel groups 1*a* and 1*b*. Therefore, even when the effective voltage in the first blue sub-pixel 4*a* is decreased, such a decrease is unlikely to cause a problem in display. Thus, a blue sub-pixel is interposed between signal lines of the same polarity, whereby deterioration of display quality which would be caused by a decrease in the effective voltage is suppressed.

In the above example of embodiment 5, the first blue sub-pixel 4*a*, which is interposed between signal lines of the same polarity, has substantially the same aperture ratio as that of the second blue sub-pixel 4*b* included in the same pixel 1, but the first blue sub-pixel 4*a* and the second blue sub-pixel 4*b* may have different aperture ratios as in embodiment 2. For example, the aperture ratio of the first blue sub-pixel 4*a* may be lower than that of the second blue sub-pixel 4*b* by 10% to 30% (e.g., about 20%).

In embodiment 5, each of the sub-pixel groups 1*a* and 1*b* is formed by the sub-pixels of five colors, red, green, blue, yellow and cyan. A stripe is visually perceived between the yellow sub-pixel 22 having the highest luminosity factor and the blue sub-pixel 4 having the lowest luminosity factor. In embodiment 5, as shown in FIG. 12, the blue sub-pixel 4 having the lowest luminosity factor is interposed between (i.e., sandwiched by) the green sub-pixel 3 having the highest luminosity factor and the yellow sub-pixel 22 having the second highest luminosity factor. With this arrangement, the stripe is unlikely to be visually perceived.

(Variations)

In the above-described examples of embodiments 1-5, the arrangement of sub-pixels is the stripe arrangement. However, according to the present invention, it is possible to employ a delta arrangement, a mosaic arrangement or a square arrangement. In the examples of embodiments 1-5, the pixel 1 includes two sub-pixel groups 1*a* and 1*b*. However, according to the present invention, the pixel 1 may include three or more sub-pixel groups. The number of sub-pixels of a hue included in a sub-pixel group may be different from the number of sub-pixels of a different hue included in the sub-pixel group. For example, one sub-pixel group may include four sub-pixels of three colors: a red sub-pixel, a blue sub-pixel, a green sub-pixel and another blue sub-pixels. Further, the order of the arrangement of sub-pixels included in the sub-pixel group is not limited to those described in embodiments 1-5. For example, in the case where a sub-pixel group includes sub-pixels of red, green and blue, the sub-pixels may be aligned in the row direction in the order of red, blue and green, although the sub-pixels are aligned in the order of red, green and blue in embodiment 1.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention. For example, the liquid crystal driving element is not limited to a TFT but may be a different active driving element, such as an MIM (Metal Insulator Metal) element, or the like. Alternatively, a passive driving mode which does not use a driving element may be employed. Further, the present invention is not limited to TN mode but may be applied to other liquid crystal modes, such as IPS (In-Plane Switching) mode, MVA (Multi-domain Vertical Alignment) mode, etc. Furthermore, the liquid crystal display device of the present invention is not limited to a transmissive LCD. The present invention is applicable to both reflective and transreflective LCDs.

The display device of the present invention can be used for various display devices, such as a LCD, a PDP, an inorganic or organic EL display device, a LED display device, a fluorescence display tube, a field emission display device, an electrophoretic display device, an electrochromic display device, a CRT display device, etc. For example, the display device of the present invention can be used for a display of a personal computer, a display of an amusement apparatus, such as a pachinko machine, or the like, a display of a mobile phone, a color television display, etc.

What is claimed is:

1. A display device, comprising a plurality of pixels arranged in a matrix: wherein at least one of the pixels includes a plurality of sub-pixel groups;

each of the sub-pixel groups includes sub-pixels of three or more colors;

sub-pixels of the same color in each pixel are driven by the same signal;

at least one of the pixels includes two sub-pixel groups which are adjacent to each other in the row direction;

each of the two sub-pixel groups includes three or more sub-pixels periodically aligned in one direction;

each of the two sub-pixel groups includes sub-pixels of three colors periodically aligned in one direction;

the polarity pattern of the sub-pixels included in one of two pixels which are adjacent to each other in the row direction is "+•−•+•+•−•+";

the polarity pattern of the sub-pixels included in the other pixel is "−•+•−•−•+•−";

the polarity of the sub-pixels is inverted at a predetermined frequency; and a plurality of signal lines extending in the column direction and electrically connected to the sub-pixels, wherein:

each of the sub-pixels is interposed between two of the signal lines which are adjacent to each other in the row direction; and a sub-pixel which is interposed between signal lines of the same polarity has an aperture ratio different from that of a sub-pixel of the same color which is interposed between signal lines of different polarities.

2. A display device, comprising a plurality of pixels arranged in a matrix: wherein at least one of the pixels includes a plurality of sub-pixel groups;

each of the sub-pixel groups includes sub-pixels of three or more colors;

sub-pixels of the same color in each pixel are driven by the same signal;

at least one of the pixels includes two sub-pixel groups which are adjacent to each other in the row direction;

each of the two sub-pixel groups includes three or more sub-pixels periodically aligned in one direction;

each of the two sub-pixel groups includes sub-pixels of three colors, red, green and blue, periodically aligned in one direction;

the polarity pattern of the sub-pixels included in one of two pixels which are adjacent to each other in the row direction is "+•−•+•+•−•+";

the polarity pattern of the sub-pixels included in the other pixel is "−•+•−•−•+•−";

the polarity of the sub-pixels is inverted at a predetermined frequency; and a plurality of signal lines extending in the column direction and electrically connected to the sub-pixels, wherein:

each of the sub-pixels is interposed between two of the signal lines which are adjacent to each other in the row direction; and a blue sub-pixel which is interposed between signal lines of the same polarity has an aperture ratio different from that of a blue sub-pixel which is interposed between signal lines of different polarities.

3. A display device, comprising a plurality of pixels arranged in a matrix: wherein at least one of the pixels includes a plurality of sub-pixel groups;

each of the sub-pixel groups includes sub-pixels of three or more colors;

sub-pixels of the same color in each pixel are driven by the same signal;

at least one of the pixels includes two sub-pixel groups which are adjacent to each other in the row direction;

each of the two sub-pixel groups includes three or more sub-pixels periodically aligned in one direction;

each of the two sub-pixel groups includes sub-pixels of three colors, cyan, magenta and yellow, periodically aligned in one direction;

the polarity pattern of the sub-pixels included in one of two pixels which are adjacent to each other in the row direction is “+•−•+•+•−•+”;

the polarity pattern of the sub-pixels included in the other pixel is “−•+•−•−•+•−”;

the polarity of the sub-pixels is inverted at a predetermined frequency; and a plurality of signal lines extending in the column direction and electrically connected to the sub-pixels, wherein:

each of the sub-pixels is interposed between two of the signal lines which are adjacent to each other in the row direction; and a magenta sub-pixel which is interposed between signal lines of the same polarity has an aperture ratio different from that of a magenta sub-pixel which is interposed between signal lines of different polarities.

4. The display device of any one of claims 1, 2, and 3, further comprising a driving circuit for outputting a signal which is used for driving the sub-pixels, wherein the signal output from the driving signal is branched into a plurality of signals for driving the sub-pixels of the same color.

5. The display device of any one of claims 1, 2, and 3, wherein:

each of the two sub-pixel groups includes three or more sub-pixels periodically aligned in one direction.

6. The display device of claim 5, wherein one of the sub-pixels constituting the sub-pixel group which has the lowest luminosity is sandwiched along the row direction by a sub-pixel of a color having the highest luminosity factor and a sub-pixel of a color having the second highest luminosity factor.

7. The display device of any one of claims 1, 2, and 3, wherein each of the sub-pixel groups includes sub-pixels of three colors, red, green and blue.

8. The display device of any one of claims 1, 2, and 3, wherein each of the sub-pixel groups includes sub-pixels of three colors, cyan, magenta and yellow.

9. The display device of any one of claims 1, 2, and 3, wherein each of the sub-pixel groups includes sub-pixels of four colors, red, green, blue and white.

10. The display device of any one of claims 1, 2, and 3, wherein each of the sub-pixel groups includes sub-pixels of five colors, red, green, blue, yellow and cyan.

11. The display device of claim 1, further comprising a plurality of signal lines extending in the column direction and electrically connected to the sub-pixels, wherein:

each of the sub-pixels is interposed between two of the signal lines which are adjacent to each other in the row direction; and among the sub-pixels which constitute the sub-pixel groups, a sub-pixel which is interposed between signal lines of the same polarity has the lowest luminosity factor.

12. The display device of claim 2, further comprising a plurality of signal lines extending in the column direction and electrically connected to the sub-pixels, wherein:

each of the sub-pixels is interposed between two of the signal lines which are adjacent to each other in the row direction; and a sub-pixel which is interposed between signal lines of the same polarity is a blue sub-pixel.

13. The display device of claim 3, further comprising a plurality of signal lines extending in the column direction and electrically connected to the sub-pixels, wherein:

each of the sub-pixels is interposed between two of the signal lines which are adjacent to each other in the row direction; and a sub-pixel which is interposed between signal lines of the same polarity is a magenta sub-pixel.

14. A display device, comprising a plurality of pixels arranged in a matrix: wherein at least one of the pixels includes a plurality of sub-pixel groups;

each of the sub-pixel groups includes sub-pixels of three or more colors;

sub-pixels of the same color in each pixel are driven by the same signal;

at least one of the pixels includes two sub-pixel groups which are adjacent to each other in the row direction;

each of the two sub-pixel groups includes three or more sub-pixels periodically aligned in one direction;

each of the two sub-pixel groups includes sub-pixels of three colors periodically aligned in one direction;

the polarity pattern of the sub-pixels included in one of two pixels which are adjacent to each other in the row direction is “+•−•+•+•−•+”;

the polarity pattern of the sub-pixels included in the other pixel is “−•+•−•−•+•−”;

the polarity of the sub-pixels is inverted at a predetermined frequency; and a plurality of signal lines extending in the column direction and electrically connected to the sub-pixels, wherein:

each of the sub-pixels is interposed between two of the signal lines which are adjacent to each other in the row direction; and the aperture ratio of a sub-pixel which is interposed between signal lines of the same polarity and has a color of the lowest luminosity factor among the sub-pixels which constitute the sub-pixel groups is lower than that of a sub-pixel of the same color which is interposed between signal lines of different polarities by about 10% to about 30%.

15. A display device, comprising a plurality of pixels arranged in a matrix: wherein at least one of the pixels includes a plurality of sub-pixel groups;

each of the sub-pixel groups includes sub-pixels of three or more colors;

sub-pixels of the same color in each pixel are driven by the same signal;

at least one of the pixels includes two sub-pixel groups which are adjacent to each other in the row direction;

each of the two sub-pixel groups includes three or more sub-pixels periodically aligned in one direction;

each of the two sub-pixel groups includes sub-pixels of three colors, red, green and blue, periodically aligned in one direction;

the polarity pattern of the sub-pixels included in one of two pixels which are adjacent to each other in the row direction is "+•−•+•+•−•+";

the polarity pattern of the sub-pixels included in the other pixel is "−•+•−•−•+•−";

the polarity of the sub-pixels is inverted at a predetermined frequency; and a plurality of signal lines extending in the column direction and electrically connected to the sub-pixels, wherein:

each of the sub-pixels is interposed between two of the signal lines which are adjacent to each other in the row direction; and the aperture ratio of a blue sub-pixel which is interposed between signal lines of the same polarity is lower than that of a blue sub-pixel which is interposed between signal lines of different polarities by about 10% to about 30%.

16. A display device, comprising a plurality of pixels arranged in a matrix: wherein at least one of the pixels includes a plurality of sub-pixel groups;

each of the sub-pixel groups includes sub-pixels of three or more colors;

sub-pixels of the same color in each pixel are driven by the same signal;

at least one of the pixels includes two sub-pixel groups which are adjacent to each other in the row direction;

each of the two sub-pixel groups includes three or more sub-pixels periodically aligned in one direction;

each of the two sub-pixel groups includes sub-pixels of three colors, cyan, magenta and yellow, periodically aligned in one direction;

the polarity pattern of the sub-pixels included in one of two pixels which are adjacent to each other in the row direction is "+•−•+•+•−•+";

the polarity pattern of the sub-pixels included in the other pixel is "−•+•−•−•+•−";

the polarity of the sub-pixels is inverted at a predetermined frequency; and a plurality of signal lines extending in the column direction and electrically connected to the sub-pixels, wherein:

each of the sub-pixels is interposed between two of the signal lines which are adjacent to each other in the row direction; and the aperture ratio of a magenta sub-pixel which is interposed between signal lines of the same polarity is lower than that of a magenta sub-pixel which is interposed between signal lines of different polarities by about 10% to about 30%.

* * * * *